(12) United States Patent
Tribelhorn et al.

(10) Patent No.: US 8,265,393 B2
(45) Date of Patent: Sep. 11, 2012

(54) PHOTO-DOCUMENT SEGMENTATION METHOD AND SYSTEM

(75) Inventors: Benjamin R. Tribelhorn, Corvallis, OR (US); Aaron D. Wolin, College Station, TX (US); Stephen T. Smith, Mukilteo, WA (US); Adam R. Field, Long Beach, CA (US); Zachary B. Dodds, Claremont, CA (US)

(73) Assignee: Compulink Management Center, Inc., Long Beach, CA (US)

( * ) Notice: Subject to any disclaimer, the term of this patent is extended or adjusted under 35 U.S.C. 154(b) by 1106 days.

(21) Appl. No.: 12/113,940

(22) Filed: May 1, 2008

(65) Prior Publication Data
US 2009/0175537 A1 Jul. 9, 2009

Related U.S. Application Data

(60) Provisional application No. 60/927,256, filed on May 1, 2007, provisional application No. 60/927,308, filed on May 1, 2007.

(51) Int. Cl.
*G06K 9/36* (2006.01)
(52) U.S. Cl. ........................... 382/173; 382/199
(58) Field of Classification Search ................ 382/112, 382/173, 174, 176, 199; 358/449, 453, 462, 358/464
See application file for complete search history.

(56) References Cited

U.S. PATENT DOCUMENTS

| | | | | |
|---|---|---|---|---|
| 4,783,833 A | 11/1988 | Kawabata et al. | ............ | 382/22 |
| 5,280,367 A | 1/1994 | Zuniga | ............ | 358/462 |
| 5,280,546 A | 1/1994 | Machida et al. | ............ | 382/47 |
| 5,377,019 A | 12/1994 | Okisu et al. | ............ | 358/464 |
| 5,515,181 A | 5/1996 | Iyoda et al. | ............ | 358/474 |
| 5,585,962 A | 12/1996 | Dixon | ............ | 359/328 |
| 5,677,776 A | 10/1997 | Matsuda et al. | ............ | 358/475 |
| 5,742,354 A | 4/1998 | Vlahos et al. | ............ | 348/586 |
| 5,764,228 A | 6/1998 | Baldwin | ............ | 345/344 |
| 5,764,383 A | 6/1998 | Saund et al. | ............ | 358/497 |
| 5,774,237 A | 6/1998 | Nako | ............ | 358/471 |
| 5,831,750 A | 11/1998 | Okisu et al. | ............ | 358/493 |
| 5,848,183 A | 12/1998 | Farrell | ............ | 382/172 |
| 6,011,635 A | 1/2000 | Bungo et al. | ............ | 358/488 |
| 6,014,470 A | 1/2000 | Matsuda | ............ | 382/275 |
| 6,064,778 A | 5/2000 | Pasco et al. | ............ | 382/289 |
| 6,134,346 A | 10/2000 | Berman et al. | ............ | 382/163 |
| 6,282,326 B1 | 8/2001 | Lee et al. | ............ | 382/289 |
| 6,304,313 B1 | 10/2001 | Honma | ............ | 355/18 |

(Continued)

FOREIGN PATENT DOCUMENTS
EP 0 949 802 A2 10/1999
(Continued)

OTHER PUBLICATIONS

Document Copy Stand and Digital Camera, Sky Mall Magazine, Late Spring 2004, p. 5, American Airlines.

(Continued)

*Primary Examiner* — Andrew W Johns
(74) *Attorney, Agent, or Firm* — Dickstein Shapiro LLP

(57) ABSTRACT

The present application provides an improved segmentation method and system for processing digital images that include an imaged document and surrounding image. A plurality of edge detection techniques are used to determine the edges of the imaged document and then segment the imaged document from the surrounding image.

23 Claims, 41 Drawing Sheets

U.S. PATENT DOCUMENTS

| | | | |
|---|---|---|---|
| 6,310,984 B2 | 10/2001 | Sansom-Wai et al. | 382/289 |
| 6,385,347 B1 | 5/2002 | Matsuda | 382/263 |
| 6,430,320 B1 | 8/2002 | Jia et al. | 382/289 |
| 6,453,056 B2 | 9/2002 | Laumeryer et al. | 382/104 |
| 6,525,741 B1 | 2/2003 | Klassen et al. | 345/589 |
| 6,630,938 B1 | 10/2003 | Nanni | 345/629 |
| 6,633,332 B1 | 10/2003 | Nay et al. | 348/220.1 |
| 6,687,420 B1 | 2/2004 | Matsuda et al. | 382/286 |
| 6,716,175 B2 | 4/2004 | Geiser et al. | 600/450 |
| 6,750,974 B2 | 6/2004 | Svetkoff et al. | 356/602 |
| 6,771,834 B1 | 8/2004 | Martins et al. | 382/257 |
| 6,806,903 B1 | 10/2004 | Okisu et al. | 348/254 |
| 6,839,463 B1 | 1/2005 | Blake et al. | 382/173 |
| 6,847,737 B1 | 1/2005 | Kouri et al. | 382/260 |
| 6,873,732 B2 | 3/2005 | Dance | 382/199 |
| 6,885,479 B1 | 4/2005 | Pilu | 358/474 |
| 6,954,290 B1 | 10/2005 | Braudaway et al. | 358/3.26 |
| 6,956,587 B1 | 10/2005 | Anson | 345/649 |
| 7,092,548 B2 | 8/2006 | Laumeyer et al. | 382/104 |
| 7,121,469 B2 | 10/2006 | Dorai et al. | 235/470 |
| 7,330,604 B2 | 2/2008 | Wu et al. | 382/289 |
| 7,418,126 B2 | 8/2008 | Fujimoto et al. | 382/154 |
| 2002/0044681 A1 | 4/2002 | Fujimoto et al. | 382/154 |
| 2003/0026482 A1 | 2/2003 | Dance | 382/199 |
| 2003/0048271 A1 | 3/2003 | Liess et al. | 345/428 |
| 2003/0053692 A1 | 3/2003 | Hong et al. | 382/171 |
| 2004/0012679 A1 | 1/2004 | Fan | 348/207.99 |
| 2004/0022451 A1 | 2/2004 | Fujimoto et al. | 382/275 |
| 2004/0099741 A1 | 5/2004 | Dorai et al. | 235/462.08 |
| 2005/0053304 A1 | 3/2005 | Frei | 382/257 |
| 2005/0175255 A1 | 8/2005 | Fujimoto et al. | 382/275 |
| 2005/0226510 A1* | 10/2005 | Eguchi et al. | 382/199 |
| 2006/0045379 A1 | 3/2006 | Heaney et al. | 382/276 |
| 2006/0140504 A1 | 6/2006 | Fujimoto et al. | 382/275 |
| 2007/0206877 A1 | 9/2007 | Wu et al. | 382/275 |
| 2007/0237428 A1* | 10/2007 | Goodwin et al. | 382/309 |
| 2007/0253031 A1 | 11/2007 | Fan | 358/3.27 |

FOREIGN PATENT DOCUMENTS

| | | |
|---|---|---|
| EP | 1571820 A2 | 9/2005 |

OTHER PUBLICATIONS

Digital Presenter, NEC Projectors Web Site: DV11, http://www.nec-pj.com/products/dv/, Aug. 2005.

Patented Xerox Technology Could Turn Camera Phone into Portable Scanner, PhoneContent.com, http://www.phonecontent.com/bm/news/gnews/584.shtml, Nov. 17, 2004.

Document Imaging With Cameras, Xerox website, http://www.xeroxtechnology.com/ip1.nsf/sedan1?readform&unid=6192C61923FED63885256FCC00691EEF, Mar. 2005.

Document Imaging With Cameras, Xerox Research Centre Europe, Mar. 2005.

An Office Action mailed Feb. 23, 2007 regarding U.S. Appl. No. 11/368,260, filed on Mar. 2, 2006.

Michael S. Brown and W. Brent Seales, "Image Restoration of Arbitrarily Warped Documents," IEEE Transactions on Pattern Analysis and Machine Intelligence, vol. 26, No. 10, pp. 1295-1306, Oct. 2004.

Zheng Zhang, Chew Lim Tan, and Liying Fan, "Restoration of Curved Document Images Through 3D Shape Modeling," Proceedings of the 2004 IEEE Computer Society Conference on Computer Vision and Pattern Recognition, 2004.

Tapas Kanungo, Robert M. Haralick, and Ihsin Phillips, "Global and Local Document Degradation Models," Proceedings of the Second International Conference on Document Analysis and Recognition, pp. 730-734, 1993 IEEE.

Shijian Lu and Chew Lim Tan, "The Restoration of Camera Documents through Image Segmentation," www home page: http://www.comp.nus.edu.sg/labs/chime/.

Michael S. Brown and Desmond Tsoi, "Correcting Common Distortions in Camera-Imaged Library Materials," Proceedings of the 2003 Joint Conference on Digital Libraries (JCDL '03), 2003.

Hironori Ezaki, Seiichi Uchida, Akira Asano, and Hiroaki Sakoe, "Dewarping of document image by global optimization," Proceedings of the 2005 Eight International Conference on Document Analysis and Recognition (ICDAR '05), 2005.

Jian Liang, Daniel DeMenthon, and David Doermann, "Flattening Curved Documents in Images," Proceedings of the 2005 IEEE Computer Society Conference on Computer Vision and Pattern Recognition (CVPR 2005), 2005.

Huaigu Cao, Xiaoqing Ding, and Changsong Liu, "Rectifying the Bound Document Image Captured by the Camera: A Model Based Approach," Proceedings of the Seventh International Conference on Document Analysis and Recognition (ICDAR '03), 2003.

John Canny, "A computational Approach to Edge Detection," IEEE Transactions on Pattern Analysis and Machine Intelligence, vol. PAMI-8, No. 6, pp. 679-698, Nov. 1986.

Jianping Fan, David, K.Y. Yau, Ahmed K. Elmagarmid, and Walid G. Aref, "Automatic Image Segmentation by Integrating Color-Edge Extraction and Seeded Region Growing," IEEE Transactions on Image Processing, vol. 10, No. 10, Oct. 2001.

B. Gatos, I. Pratikakis, K. Kepene and S.J. Perantonis, "Text Detection in Indoor/Outdoor Scene Images," National Center for Scientific Research: Demokritos, 2005. URL http://iit.demokritos.gr/~bgat/cbdar2005.pdf.

Boontee Kruatrachue, Narongchai Moongfangklang, and Kritawan Siriboon, "Fast Document Segmentation Using Contour and X-Y Cut Technique," Proceedings of World Academy of Science, Engineering and Technology, vol. 5, pp. 27-29, Apr. 2005.

Yue Lu, and Chew Lim Tan, "Improved Nearest Neighbor Based Approach to Accurate Document Skew Estimation," Proceedings of the Seventh International Conference on Document Analysis and Recognition (ICDAR 2003), 2003.

Mario I. Chacon Murgula, "Document Segmentation Using Texture Variance and Low Resolution Images," 1998 IEEE Southwest Symposium on Image Analysis and Interpretation, pp. 164-167, Apr. 1998.

Faisal Shafait, Daniel Keysers, and Thomas M. Breuel, "Pixel-Accurate Representation and Evaluation of Page Segmentation in Document Images," 2006 IEEE, URL http://pubs.iupr.org/DATA/icpr06__fs.pdf.

Victor Wu, R. Manmatha, and Edward M. Riseman, "Finding Text in Images," Proceedings of the Second ACM International Conference on Digital Libraries, Jul. 1997.

Mitsuru Yamada and Kazuo Hasuike, "Document Image Processing Based on Enhanced Border Following Algorithm," Proceedings of the 10th International Conference on Pattern Recognition, vol. II, pp. 231-236, Jun. 1990.

S.D. Yanowitz and A.M. Bruckstein, "A New Method for Image Segmentation," Proceedings of the 9th International Conference on Pattern Recognition, vol. 1, pp. 270-275, Nov. 1998.

Shijan Lu, Ben M. Chen, and C.C. Ko, "Perspective Rectification of Document Images Using Fuzzy Set and Morphological Operations," Image and Vision Computing, vol. 23, pp. 541-553, 2005.

David Crystal, "The Writing System," Cambridge University Press, Chapter 18, pp. 256-283, 2001.

Hironori Ezaki, Seiichi Uchida, Akira Asano, and Hiroaki Sakoe, "Dewarping of Document Image by Global Optimization," Proceedings of the 2005 Eight International Conference on Document Analysis and Recognition, vol. 1, pp. 302-306, 2005.

B. Gatos, I. Pratikakis, S.J. Perantonis, "Adaptive Degraded Document Image Binarization," Pattern Recognition, vol. 39, pp. 317-327, 2006.

Jian Liang, Daniel DeMenthon, and David Doerman, "Unwarping Images of Curved Documents Using Global Shape Optimization," Proceedings of the First International Workshop on Camera-Based Document Analysis and Recognition, pp. 25-29, 2005.

Rafael Dueire Lins and Bruno Tenorio Avila, "A New Algorithm for Skew Detection in Images of Documents," pp. 234-240, Springer-Vering Berlin/ Heidelberg, 2004.

Shijian Lu and Chew Lim Tan, "Document Flattening Through Grid Modeling and Regularization," Proceedings of the 18th International Conference on Pattern Recognition (ICPR'06), 2006.

Wayne Niblack, "An Introduction to Digital Image Processing," Section 5.1, pp. 113-117, Prentice Hall International, 1985.

Maurizio Pilu, "Extraction of Illusory Linear Clues in Perspectively Skewed Documents," Proceedings of the 2001 IEEE Computer Society Conference on Computer Vision and Pattern Recognition (CVPR 2001), pp. 1-363-1-368, Dec. 2001.

Lakshmand Prasad, "Morphological Analysis of Shapes," T-DOT, Theoretical Division, pp. 1-18, Jul. 1997.

J. Sauvola and M. Pietikäinen, "Adaptive Document Image Binarization," Pattern Recognition, vol. 33, pp. 225-236, 2000.

Osamu Shiku, Akira Nakamura, Masanori Anegawa, Hideaki Takahira, and Hideo Kuroda, "Extraction of Slant Character Candidates from Maps Using Circular Templates," Proceedings of the Third International Conference on Document Analysis and Recognition, vol. II, pp. 936-939, Aug. 1995.

Cedric A. Zala and Ian Barrodale, "Warping Aerial Photographs to Orthomaps Using Thin Plate Splines," Advances in Computational Mathematics, vol. 11, pp. 211-227, 1999.

Milan Sonka, Vaclav Hlavac, Roger Boyle: Image Processing, Analysis, and Machine Vision', Mar. 19, 2007, CL Engineering, XP002633279, p. 221.

Extended European Search Report dated Apr. 29, 2011 issued to European Application No. 08767496.6.

Daniel S. Le, George R. Thomas, Harry Wechsler, "Automated Page Orientation and Skew Angle Detection for Binary Document Images" Pattern Recognition, vol. 27, No. 10, pp. 1325-1344, 1994, Great Britain.

Aditya Vailaya, HongJiang Zhang, Changjiang Yang, Feng-I Liu, Anil K. Jain, "Automatic Image Orientation Detection", IEEE Transactions on Image Processing, vol. 11 No. 7, pp. 746-755, Jul. 2002.

Martin A. Fischler, Robert C. Bolles, "Random Sample Consensus: A Paradigm for Model Fitting with Applications to Image Analysis and Automated Cartography", Communications of the ACM vol. 24 No. 6, pp. 381-395, Jun. 1981.

Robert S. Caprari, "Algorithm for text page up/dowm orientation determination", Patten Recognition Letters 2, Elsevier Science B.V., pp. 311-317, 1999 Australia.

* cited by examiner

United States Patent: 4,941,125                                              Page 6 of 10 processor 12, which may be any one of a member of suitable general purpose digital computers. The processor 12 receives the image information and preferably stores this information in a buffer storage, e.g., Disk storage device 14. The processor 12 then generates the appropriate indexing information, with the help of additional data manually entered via keyboard 20, if necessary, and the multiple frames of image information together with the associated index information are stored on a digital storage medium in a manner to be described in more detail below. In a preferred embodiment of the invention, the digital storage medium will be an optical disk, although other types of high density storage devices would be acceptable. The index stored on the optical disk can then be searched by the processor 12 to obtain the addresses of frames having requested information. The disk locations can then be accessed retrieve the video information for display on a display 16. If desired, the displayed video information can be reproduced via printer 18.

The individual components and their interaction will now be described in more detail.

With regard first to the digital camera 10, the camera should be a high resolution digital camera, such as a scanning-type CCD camera having a resolution of on the order of 3000.times.1500pixels. One example of a suitable camera for use in this invention is the Model 610 camera available from Data Copy of Mountain View, California. The camera is available with a suitable software routine to permit the processor 12 to receive and process the digital output from the camera for either storage, display, printing or retransmission, e.g., To an optical disk recorder.

The video information provided by the camera 10 may represent a typewritten or handwritten document, a blueprint, photograph or even a physical object, and the output of the camera 10 will be a digital bit stream provided to the processor 12. The processor 12 may be any one of a number suitable general purpose digital computers, such as the PC XT microcomputer available from International Business Machines Corporation. The processor stores the digital video information in a disk buffer storage device 19. In the case of typewritten document, the processor may be provided with software for converting the bit-mapped video information into ASCII character data, so that the processor can determine the information content of the text. Having determined the information content of the text, the processor employs appropriate software to generate the index and cross referencing information which can also be stored in buffer 14. The software should preferably be a self-index software program which will generated data base index from full text, so that every word in the text will become a key word in the index. A suitable indexing software program would be the ZyINDEX program available from ZyLAB Corp. Of Chicago, Illinois.

The text recognition software for recognizing text and generating ASCII characters from bit mapped image data is presently available and/or can be generated from commercially available software in a very straightforward manner. For example, commercially available OCR software in effect examines the bit map, or pattern of pixels, of the character image as a scanner moves across a page. Thus, the scanner momentarily ?captures? the image of each character and recognizes each captured character image before going on to the next character. To recognize in software the characters represented by a captured digital image of an entire document, it is merely necessary to scan the digital image in the same manner as the original document would have been optically scanned by the OCR device. For example, the captured image could be displayed on a monitor, and a cursor, which may preferably cover substantially the same area as would be covered by an OCR scanner, may be moved across the monitor screen simulating the same scanning motion as an OCR scanner. The image portion covered by the cursor would be recognized by the OCR software in the same manner as is conventionally done. One example of OCR software suitable for modification for use in the present invention is the software used in the OMNI-READER optical character reader available from Oberon International having offices in Irving, Texas and London, England. The only modification necessary to this software would be to substitute the digital image information, from a region of the image covered by a cursor, for the image information http://patft.uspto.gov/netacgi/nph-Parser?Sect2=HITOFF&p=/netahtml...   3/9/2004

*FIG. 15*

PHOTO-DOCUMENT SEGMENTATION METHOD AND SYSTEM

CROSS-REFERENCE TO RELATED APPLICATIONS

The present application claims priority under 35 U.S.C. 119(e) to U.S. Provisional Application No. 60/927,256 filed May 1, 2007 and U.S. Provisional Application No. 60/927,308 filed May 1, 2007, both of which are hereby incorporated by reference.

BACKGROUND

1. Technical Field

This application generally relates to a method and system for processing a digital image and, more particularly, for processing a digital image comprising a document image and surrounding image.

2. Description of Related Art

Document management systems are becoming increasingly popular. Such systems ease the burden of storing and handling large databases of documents. To use such systems with paper documents, digital images of the paper documents to be electronically stored must be captured.

There are a variety of potential devices for capturing digital images of paper documents, including digital cameras, scanners, and cellular phones with built-in digital cameras. Digital images of documents may also be obtained by digitizing an image of a document captured with a conventional film camera. A variety of systems also exist for processing digital images of paper documents captured by such devices. For example, it is known to separate the document image in a captured image from the remainder or surrounding image using a process known as segmentation.

Although segmentation processes may be applicable to both camera and scanner captured images, it tends to be easier to separate the imaged document from the surrounding image in scanner captured images than camera captured images. This is because the conditions under which the image is captured tend to vary more when using a camera than a scanner. It is also more likely that conditions that are less than optimal for existing segmentation techniques—including shadows, poor lighting, indistinct backgrounds, multiple documents in image, and occlusions due to folds, paperclips, tears, etc.—will be encountered when using a camera to capture an image of a document. Use of a camera can also introduce image distortions, which are generally less prevalent in scanner captured images. Such distortions may include distortions caused by the angle of the camera relative to the document ("perspective distortion"), the lens used by the camera and its distance from the document, the relative flatness of the document (e.g., whether the document being imaged is situated on a flat or curved surface), and other factors. As a result, currently known segmentation techniques do not adequately segment the captured image in many situations, particularly when the captured image has been captured using a camera. A need, therefore, exists for an improved system and method for segmenting a captured digital image of a document into an imaged document and its surrounding image. More particularly, a need exists for a system and method of segmenting that provides improved segmentation rates when one or more of the less than optimal conditions mentioned above are encountered.

SUMMARY

The present patent document provides an improved segmentation method and system for processing digital images that include an imaged document and surrounding image. For purposes of the present patent document, a digital image that includes an imaged document and surrounding image shall be understood to refer to digital images that display at least some portion of all four edges of the document of interest.

In one embodiment, the system and method uses a plurality of edge detection techniques to determine the edge lines of the imaged document and then segment the imaged document from the surrounding image. In another embodiment, a method is provided comprising: finding potential edges of the imaged document by at least two different computer implemented edge detection techniques; grouping the found potential edges into top, bottom, left and right side potential edge groups; for each edge group, selecting a subset of potential edges that are determined to likely represent an edge of the imaged document; determining the edges of the imaged document from the subsets of potential edges; and segmenting the imaged document from the digital image using the determined edges of the imaged document.

In a preferred implementation, the step of determining the edges of the imaged document from the subset of potential edges comprises a process of generating a plurality of edge sets from the subsets of potential edges. Preferably generating a plurality of edge sets includes determining each possible edge set that can be determined from the subsets. The step of determining the edges of the imaged document from the subset of potential edges also preferably further comprises selecting the edge set that most accurately represents the edges of the imaged document based on predefined comparison criteria. The predefined comparison criteria that are used preferably provide a fitness measure for the edge sets, and may include, for example, trapezoidality, area, contrast, texture, and line extension or shrinkage. The predefined selection criteria employed in the method are preferably weighted to reflect their relative importance in determining the edge set that most likely represents the true edges of the imaged document.

According to another aspect of the present patent document, a method for processing a digital image comprising an imaged document and surrounding image is provided that comprises the steps of: generating a plurality of potential edge sets for the imaged document using one or more computer implemented edge detection techniques; selecting from the plurality of edge sets the edge set that most accurately represent the edges of the imaged document based on predefined comparison criteria; and segmenting the imaged document from the digital image using the determined edges of the imaged document.

In yet another aspect of the present patent document, a method for processing a digital image comprising an imaged document and surrounding image is provided, wherein the method comprises the steps of: finding potential edges of said imaged document by at least two different computer implemented edge detection techniques; grouping the found potential edges into top, bottom, left and right side potential edge groups; for each edge group, selecting a subset of potential edges that are determined to likely represent an edge of the imaged document; generating a plurality of edge sets from the subsets of potential edges; selecting from the plurality of edge sets a small subset of edge sets that are determined to most accurately represent the edges of the imaged document by using predefined comparison criteria; displaying a small subset of the edge sets on a computer graphic user interface; receiving an input from a user corresponding to the best displayed edge set; and segmenting the imaged document from the digital image using the best displayed edge set.

In still another aspect of the present patent document, a method for processing a digital image comprising an imaged document and surrounding image, wherein the method comprises: generating a plurality of potential edge sets for the imaged document using one or more computer implemented edge detection techniques; selecting from the plurality of edge sets a small subset of edge sets that are determined to most accurately represent the edges of the imaged document by using predefined comparison criteria; displaying the small subset of edge sets on a computer graphic user interface; receiving an input from a user corresponding to the best displayed edge set; and segmenting the imaged document from the digital image using the best displayed edge set.

The foregoing methods may be readily implemented on a variety of computer systems. Systems for processing captured images according to the present application thus include computers programmed to carry out the methods described herein. Similarly, another aspect of the present application is directed to computer readable medium that causes one or more processors to perform the methods described herein.

The above and other objects, features and advantages of the invention will be better understood from the following description taken considered in connection with the accompanying drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention. It is to be expressly understood, however, that the drawings are for the purpose of illustration only and are not intended as a definition of the limits of the invention.

FIG. 15 shows a text-box edge set derived for the digital image of FIG. 9 from the text lines shown in FIG. 14.

DETAILED DESCRIPTION

Embodiments of the present disclosure are described herein in the context of a method and system for processing a digital image. Those of ordinary skill in the art will realize that the following detailed description is illustrative only and is not intended to be in any way limiting. Other embodiments and aspects of the disclosed invention will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
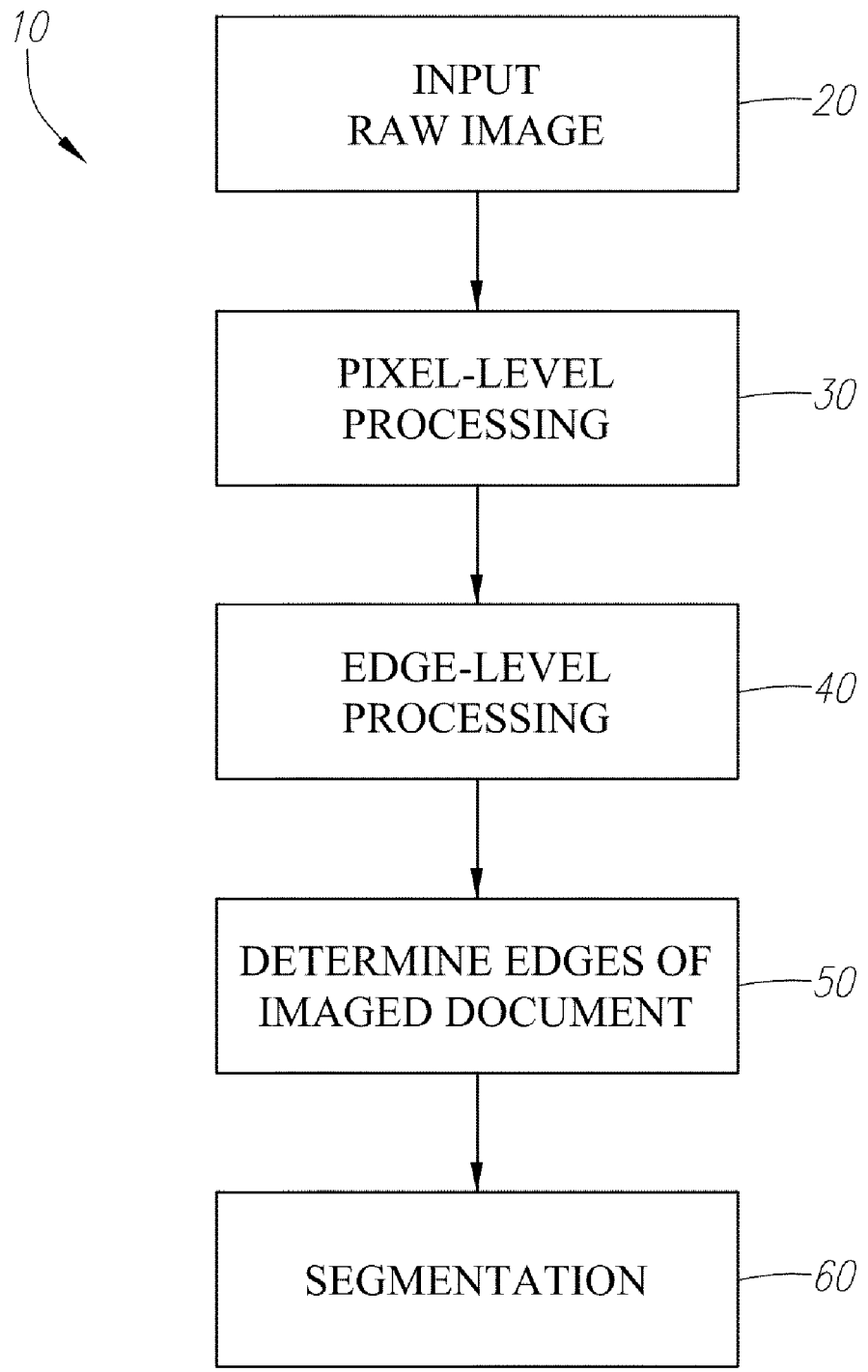
FIG. 1 is a flow chart illustrating steps of an exemplary photo-document segmentation method according to the present patent document.

FIG. 1 is a flow chart illustrating steps of an exemplary imaged document segmentation process 10 according to one aspect of the present patent document. The exemplary imaged document segmentation process 10 comprises raw image input step 20, in which a digital image including an imaged document and surrounding image is input into the image processing system, a pixel-level processing step 30, an edge-level processing step 40, a determining edges of imaged document step 50, and a segmentation step 60.

Figure 2:
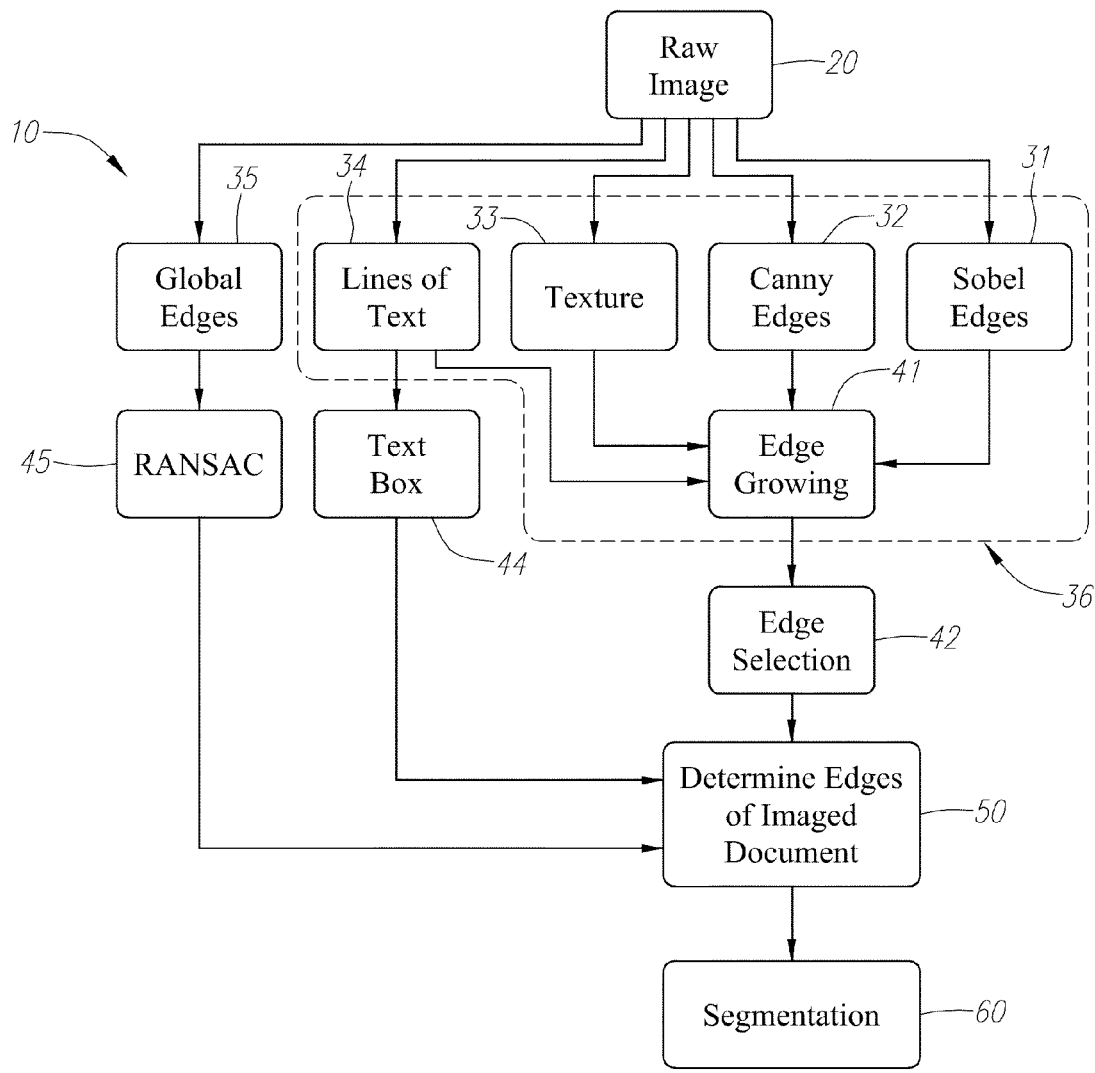
FIG. 2 is a flow chart illustrating one implementation of the photo-document segmentation method of FIG. 1.

FIG. 2 is a flow chart illustrating one implementation of the photo document segmentation method 10 shown in FIG. 1. As an initial step, a raw digital image is input into an image processing system in step 20. The digital image input in step 20 comprises an imaged document and surrounding image. The digital image may be obtained from a variety of sources. For example, the digital image may be directly captured using a digital image capturing device such as a digital camera. In addition, the digital image may be captured initially using a conventional film camera and then the captured image digitized for use in method 10.

Figure 3A:
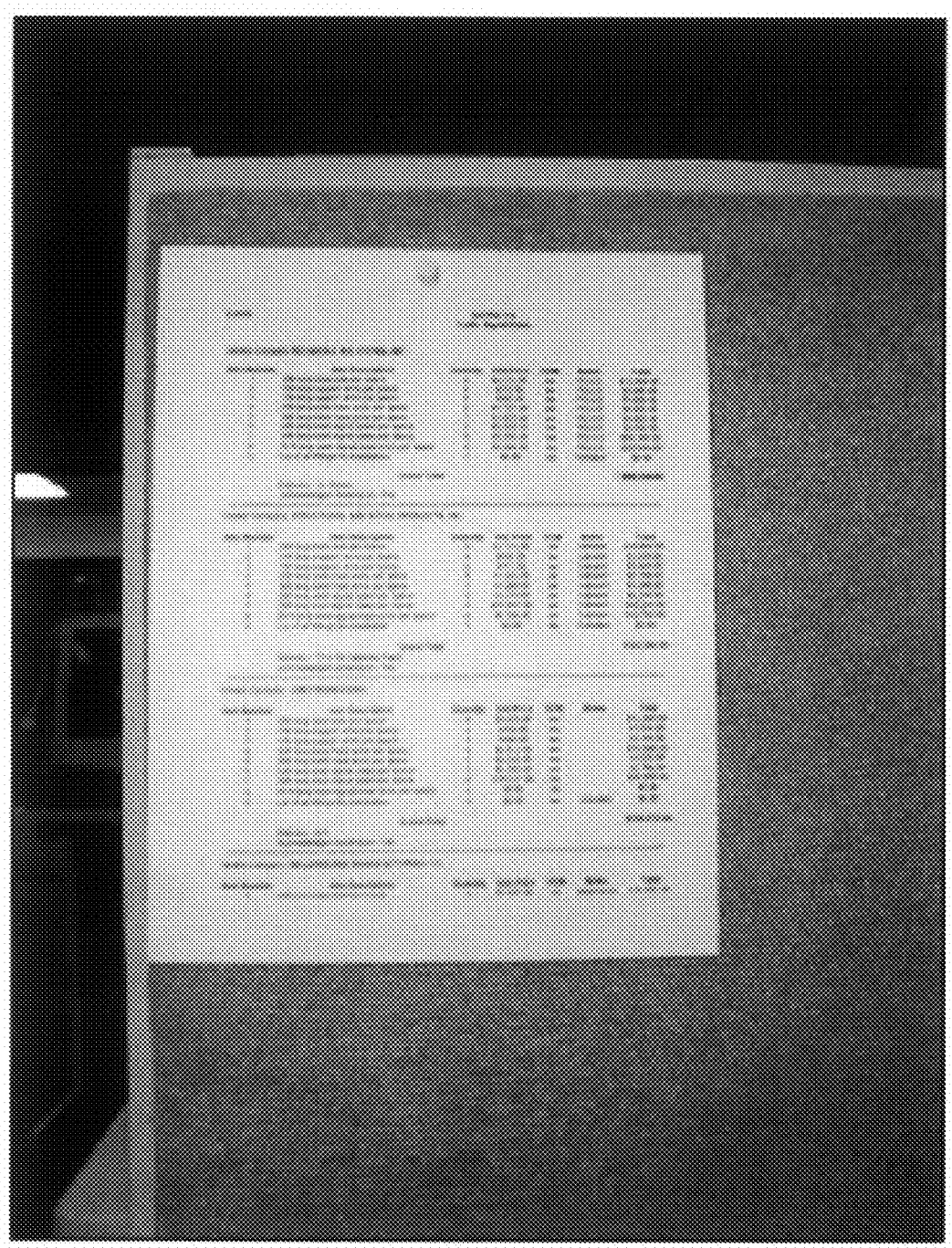
FIG. 3A shows an exemplary digital image containing an imaged document and surrounding image.
Figure 3B:
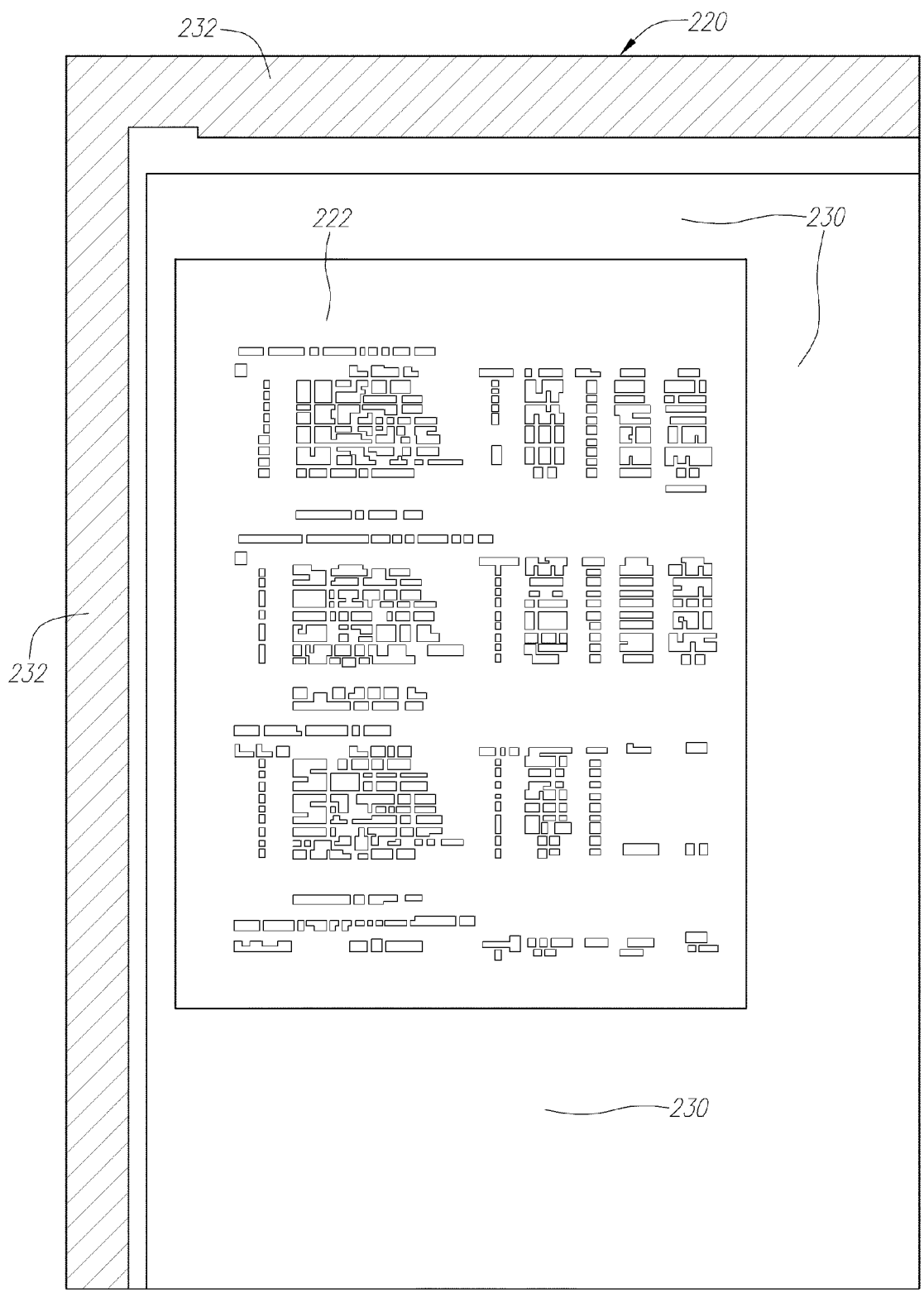
FIG. 3B is a schematic representation of the digital image in FIG. 3A.

FIG. 3A shows an exemplary raw digital image that may be processed in the photo-document segmentation methods and systems of the present application, such as method 10 shown in FIG. 2. FIG. 3B is a schematic representation of the digital image of FIG. 3A. As seen from FIGS. 3A and 3B, the raw digital image 220 contains a document image 222 and a surrounding image, which in the illustrated case includes a bulletin board 230 and background 232, which includes various items of differing contrast, such as the computer monitor and computer stand seen to the left of imaged document 220 in FIG. 3A.

The digital image 220 that is input in step 20 is initially subjected to pixel level processing 20. In the embodiment shown in FIG. 2, pixel level processing step 30 includes a variety of operations 31-35. More particularly, the pixel-level processing step 30 includes a Sobel edges pixel detecting operation 31, a Canny edges detecting operation 32, a text texture operation 33, a lines of text operation 34 and a global edges operation 35. The outputs generated from the pixel-level operations 31-35 are then subjected to edge-level processing step 40. Edge-level processing operations may, for example, include edge-level operations 41, 42, 44, and 45 shown in FIG. 2.

More particularly, in the embodiment of FIG. 2, the edge-level processing step 40 includes an edge growing operation 41, an edge selection operation 42, a text box operation 44, and a RANSAC operation 45. Further, as reflected in the embodiment illustrated in FIG. 2, outputs from the Sobel edges pixel detecting operation 31, the Canny edges detecting operation 32, the text texture operation 33, and the lines of text operation 34 may be subjected to the edge growing operation 41. Further, the outputs of these operations may be averaged together before performing the edge growing operation 41 so that the edge growing operation 41 may be performed on the combined outputs of these operations. In other embodiments, however, outputs from only one or two of these operations may be further processed in the edge growing operation 41. For example, in one embodiment, the filter responses from the text texture operation 33 and Sobel edges pixel detecting operation 31 are averaged together into a confidence map, which is then used in the edge growing operation 41 to grow possible edges for the digital image 220.

As seen from FIG. 2, the output from the lines of text operation 34 is also, or in the alternative, sent to the text box operation 44 and the output of the global edges operation 35 is sent to the RANSAC operation 45. The output of the edge growing operation 41 is further sent to the edge selection operation 42, which is then sent to step 50 for the determination of the edges of the imaged document.

In the embodiment of FIG. 2, the output of edge selection step 42 is preferably one subset of potential edges corresponding to each of the top, bottom, left, and right side edges of the imaged document 220 for a total of four subsets of edges. The potential edges that are selected for inclusion in each of these subsets of potential edges are preferably selected based on a determination that they are the most likely potential edges—from all of the edges found by using the plurality of computer implemented edge detection techniques employed in step 36—to represent the true edges of the imaged document 222. In one embodiment, the determining step 50 includes generating a plurality of edge sets from the four subsets of potential edges. More preferably, the determining step 50 includes determining each possible edge set from the subsets of the potential edges.

As shown in FIG. 2 the edge sets output from the text box operation 44 and the RANSAC operation 45, respectively, are preferably used together with the plurality of edge sets determined from the four subsets of potential edges in step 50. The output of step 50 is used in segmentation step 60 to separate the imaged document 222 of the digital image 220 that was input in step 20 from the surrounding image, such as bulletin board 230, and background 232.

Before going into details of each operation, the term confidence map is first briefly described. A confidence map is a standardized representation reflecting the degree of confidence calculated by the image processing algorithm that a given pixel in the original image is part of the target document. For example, in one embodiment, 0 value may be used to indicate that there is no information about whether a pixel is in the document and thus reflect zero confidence, and a 1 value may be used to represent complete confidence that the corresponding pixel is in the target document. Alternatively, a 1 value may mean that there is zero confidence, and a 0 value may mean complete confidence. Yet in another embodiment, a 0 value may mean zero confidence that there is no information about whether that pixel is not in the document, and a 1 value mean complete confidence that the pixel is not in the target document. Alternatively, a 0 value may be used to indicate that there is no information about whether a pixel is in the document and thus reflect zero confidence, a 1 value may be used to represent complete confidence that the corresponding pixel is in the target document, and a −1 value may be used to reflect complete confidence that a corresponding pixel is not in the target document.

The confidence map provides a standard for evaluating different segmentation algorithms. By standardizing interim output in this way, the results of various algorithms can be compared. For example, a confidence map can be used when the results of several algorithms need to be averaged or the overall result needs to be analyzed. A confidence map also provides a useful visualization of the results of a particular algorithm or set of algorithms. In the present embodiment, each of the Sobel edge pixel detecting operation 31, the text texture operation 33, and the lines of text operation 34 may produce a confidence map as the output and those confidence maps may be averaged together as discussed above.

Figure 4A:
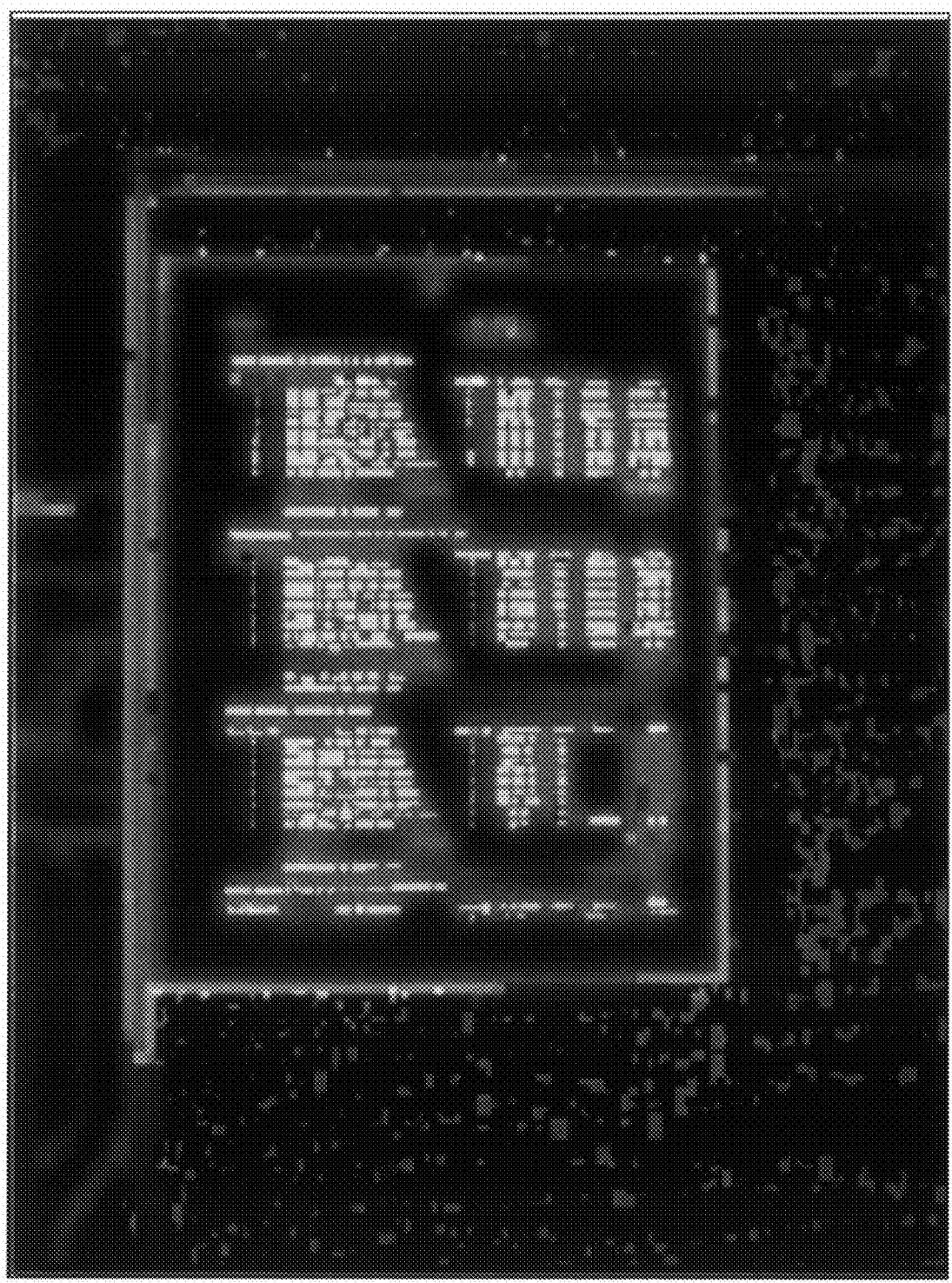
FIG. 4A shows a confidence map generated from the digital image in FIG. 3A and which summarizes information from multiple image processing routines.
Figure 4B:
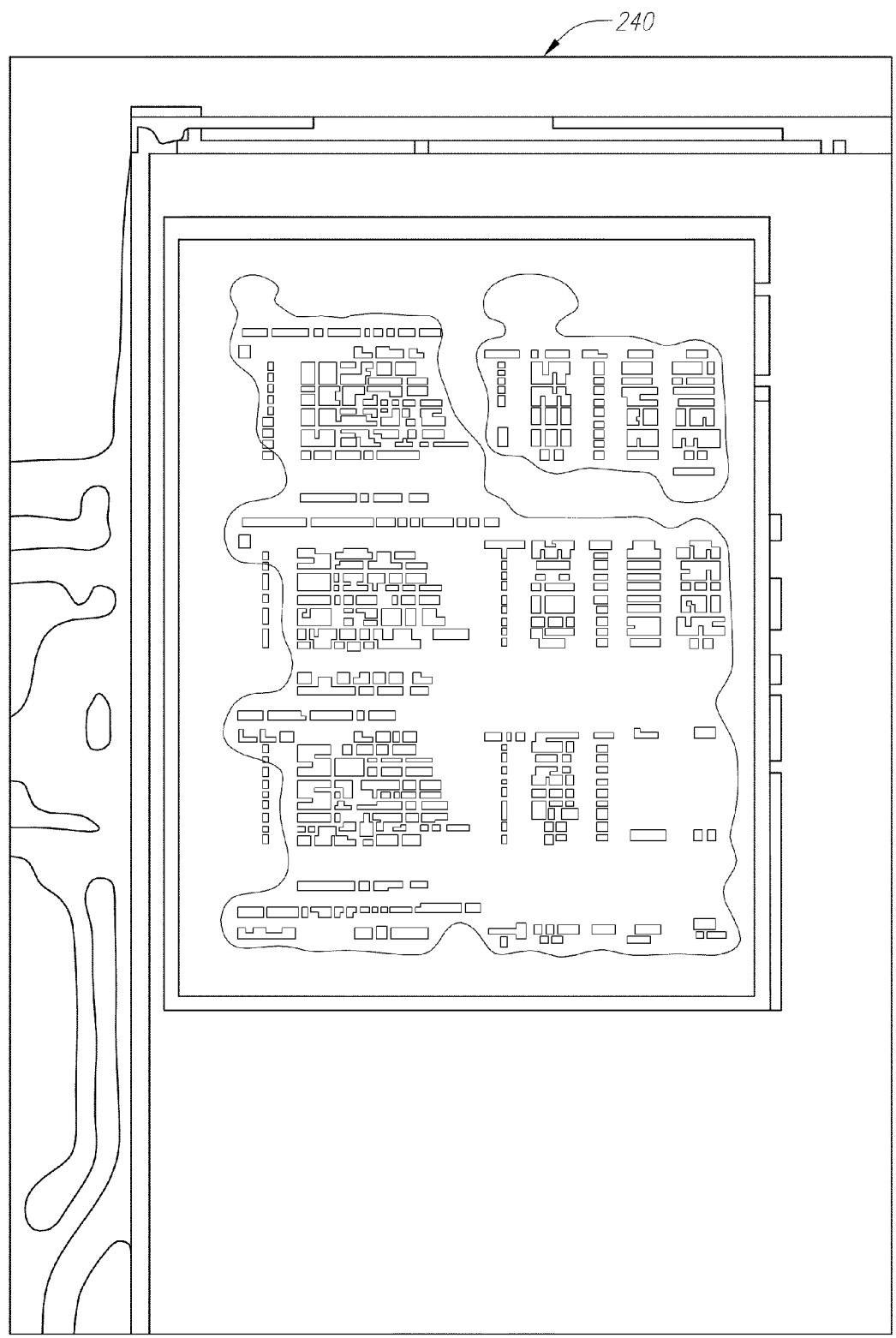
FIG. 4B is a schematic representation of the confidence map of FIG. 4A.

FIG. 3A shows an exemplary raw image containing a document image. FIG. 3B shows a schematic drawing of FIG. 3A. The raw image 220 contains a document image 222 and a surrounding image 230, 232 which includes a bulletin board 230 and the background 232. The goal is to separate the document image 222 from its surrounding image 230, 232 for further image processing. In the illustrated embodiment, besides other operations, each pixel in the image of FIG. 3A is processed by the Sobel edge pixel detecting operation 31, the text texture operation 33, and the lines of text operation 34 and the resulting confidence maps may be averaged to derive a confidence map as shown in FIG. 4A for further processing. All the correct document edges and other objects having the characteristic of an edge are highlighted in the confidence map of FIG. 4A. FIG. 4B is a schematic drawing of FIG. 4A. For illustrative purpose, FIG. 4B is shown as a negative of FIG. 4A. In one embodiment, a confidence map is printed as a grayscale image, where higher confidence corresponds to higher intensity that image shows exactly what knowledge an algorithm has provided.

The following paragraphs describe the details for each of the operations in FIG. 2. In pixel-level operations 31-35, properties of the pixels in the image are translated into higher-level structures and concepts.

One of the pixel-level operations is the Sobel edge pixel detecting operation 31. The technique of Sobel edge pixel detection technique is well known in the art and thus does not require a detailed description here. The operator of the Sobel edge pixel detecting operation 31 is a discrete differentiation operator which computes an approximation of the gradient of the image intensity function at each pixel, and gives the direction of the largest possible increase from light to dark and the rate of change in that direction. The term gradient is used for a gradual blend of color which can be considered as an even gradation from low to high values.

The result of the Sobel edge pixel detecting operation 31 shows the degree of abruptness or smoothness the image changes at that pixel, and therefore how likely it is that the part of the image represents an edge, and how that edge is likely to be oriented.

For speeding up computation and reducing the false positives of text, in the present embodiment, a lesser resolution of image is used. In one embodiment, an image having a resolution of one-eighth is used.

In one embodiment, the Sobel edge pixel detecting operation 31 uses two 3×3 kernels which are convolved with the original image to calculate approximations of the derivatives—one for horizontal changes, and the other for vertical changes. If A is denoted as the source image, and $G_x$ and $G_y$ are two images which at each pixel contain the horizontal and vertical derivative approximations. $G_x$ and $G_y$ are the results of two dimensional convolutions between the 3×3 filters and A. $G_x$ and $G_y$ can be computed as:

$$G_x = \begin{bmatrix} -1 & +0 & +1 \\ -2 & +0 & +2 \\ -1 & +0 & +1 \end{bmatrix} * A \text{ and } G_y = \begin{bmatrix} +1 & +2 & +1 \\ +0 & +0 & +0 \\ -1 & -2 & -1 \end{bmatrix} * A$$

At each point in the image, the resulting gradient approximations can be combined to give the gradient magnitude by using:

$$G = \sqrt{G_x^2 + G_y^2}$$

and the gradient's direction can be calculated by:

$$\Theta = \tan^{-1}\left(\frac{G_y}{G_x}\right)$$

where, for example, $\Theta$ is 0 for a vertical edge.

Assumed that there is an underlying continuous intensity function that has been sampled at any image pixel, the derivative of the continuous intensity function can be computed as a function on the sampled intensity function (i.e. the digital image). As a result, the derivatives at any particular pixel are functions of the intensity values at virtually all image pixels. However, approximations of these derivative functions can be defined at lesser or larger degrees of accuracy.

In one embodiment, the Sobel operation 31 can be implemented by means of hardware. Yet in another embodiment, the Sobel operation 31 can be implemented by means of software. Only eight image pixels around a pixel are needed to compute the corresponding result and only simple integer mathematics is needed to compute the gradient vector approximation. Furthermore, the two discrete filters described above are both separable:

$$\begin{bmatrix} -1 & +0 & +1 \\ -2 & +0 & +2 \\ -1 & +0 & +1 \end{bmatrix} = \begin{bmatrix} 1 \\ 2 \\ 1 \end{bmatrix} * [-1 \; +0 \; +1] \text{ and}$$

$$\begin{bmatrix} +1 & +2 & +1 \\ +0 & +0 & +0 \\ -1 & -2 & -1 \end{bmatrix} = \begin{bmatrix} +1 \\ 0 \\ -1 \end{bmatrix} * [+1 \; +2 \; +1]$$

The two derivatives $G_x$ and $G_y$ can therefore be computed as $$G_x = \begin{bmatrix} 1 \\ 2 \\ 1 \end{bmatrix} * [-1 \; +0 \; +1] * A \text{ and } G_y = \begin{bmatrix} +1 \\ 0 \\ -1 \end{bmatrix} * [+1 \; +2 \; +1] * A$$

This separable computation is advantageous since it implies fewer arithmetic computations for each image pixel.

Figure 5:
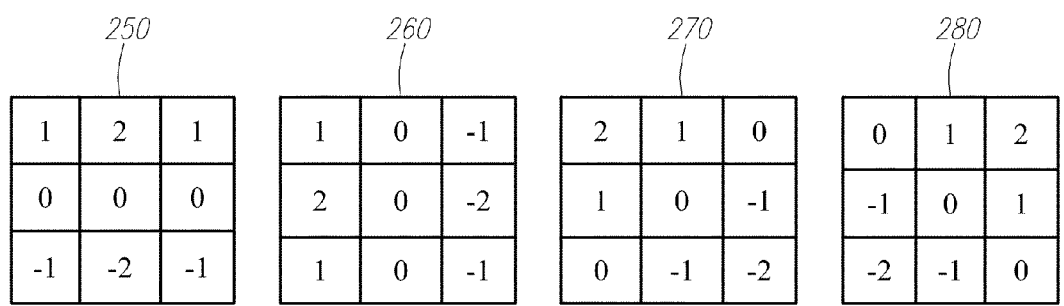
FIG. 5 shows four exemplary filters used for performing a Sobel edge detection technique in accordance with one embodiment of the present application method of FIG. 2.
Figure 6A:
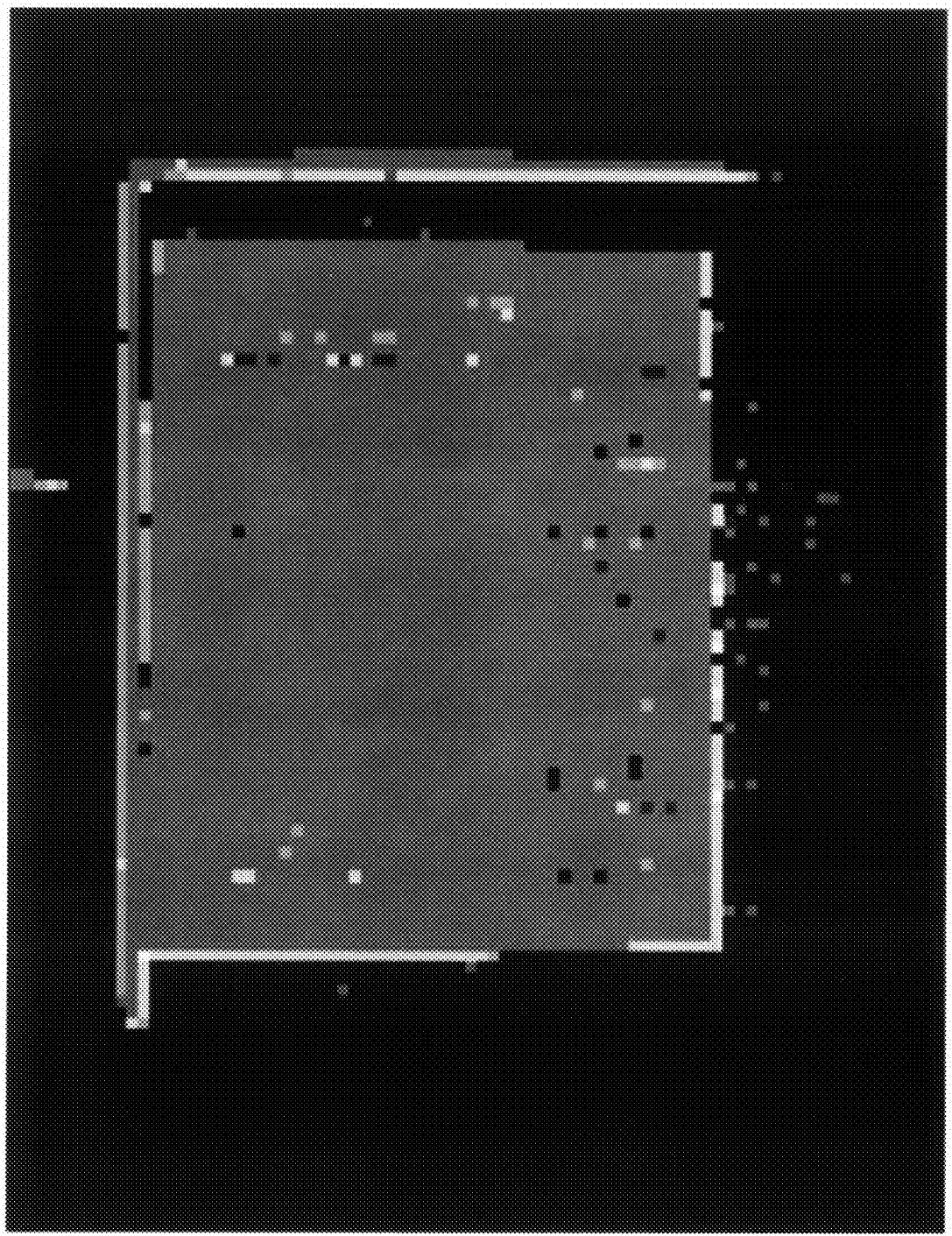
FIG. 6A shows an edge response derived from the digital image of FIG. 3A using the four filters of FIG. 5.
Figure 6B:
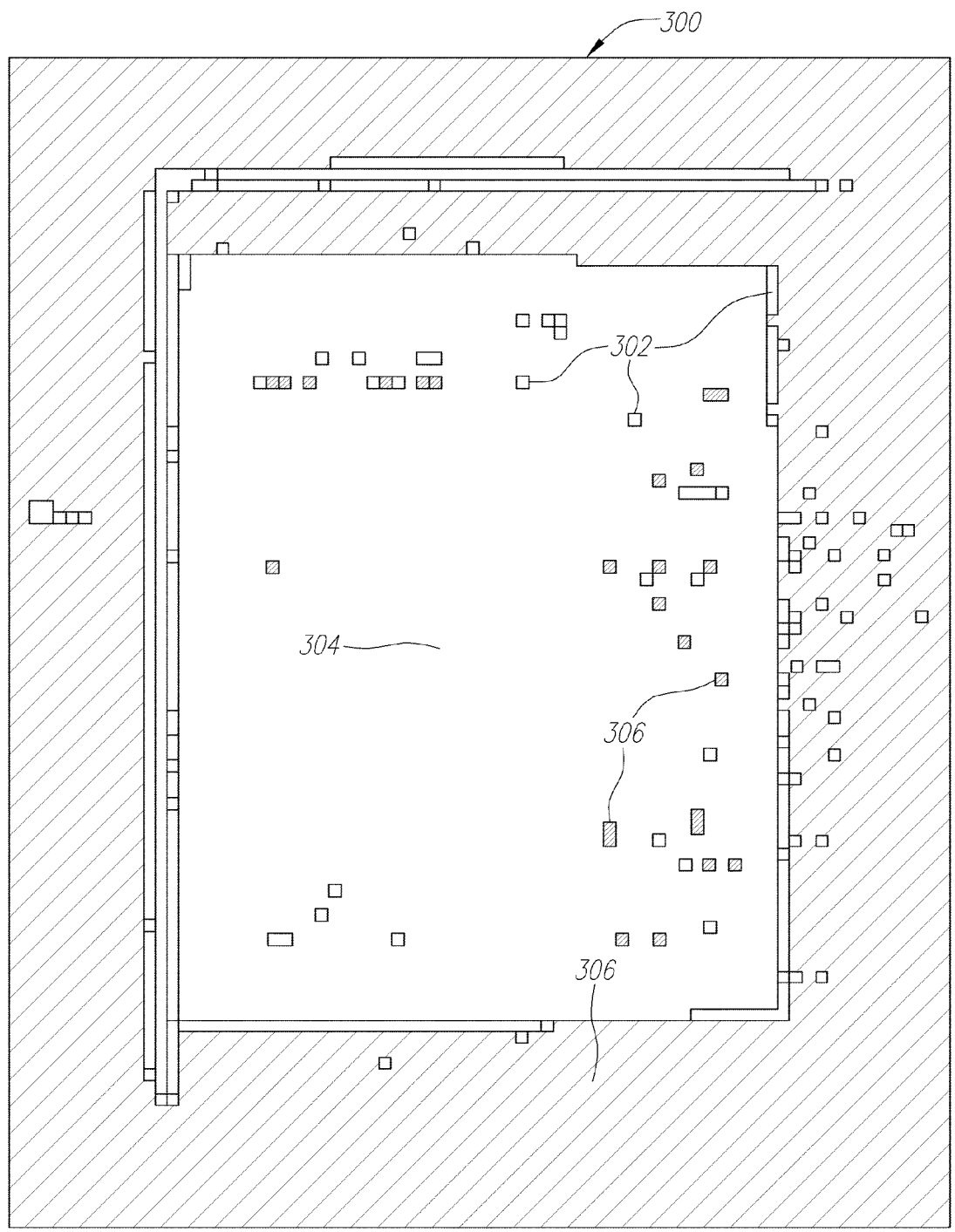
FIG. 6B is a schematic representation of FIG. 6A.

In the present embodiment, a naive threshold is used to generate binary image (i.e., to set a pixel to be a 1 or a 0 depending on whether the pixel pass the threshold value. The resulting digitized image is then filtered by a set of four filters 250, 260, 270, 180 as shown in FIG. 5 having the combined effect of an isotropic filter. The response from these filters 250, 260, 270, 180 is then used as an indication of the likelihood that a set of pixels being an edge. The result of this filtering gives a response for a large section of the original image (24×24-pixel square which is a result of 3×3 pixel square with one-eighth of resolution). FIG. 6A shows an edge response of FIG. 3A derived from the filters of FIG. 5. FIG.

6B shows a schematic drawing of FIG. 6A. The white areas 302 represent stronger response, the gray areas 304 is moderate response, and the black areas 306 represent no response. This conveniently produces a local region of high edge confidence that can be further processed to find exact edges.

Another method for finding edges is the Canny edge detecting operation 32. Canny edge detecting algorithm is well-known in the field of image processing. The algorithm smoothes an image, determines the gradient at each pixel, and determines the local maxima. Then, all maxima above an upper threshold are marked as edges and extended until they drop below a lower threshold. The algorithm finds virtually everything that could be considered an edge in the image. Processing stages of the Canny algorithm are briefly described below.

The first stage of the Canny operation 32 is called noise reduction. Because the Canny edge detector uses a filter based on the first derivative of a Gaussian, it is susceptible to noise present on raw unprocessed image data, so to begin with the raw image is convolved with a Gaussian filter. The result is as a slightly blurred version of the original which is not affected by a single noisy pixel to any significant degree.

The second stage of the Canny operation 32 is to find the intensity gradient of the image. An edge in an image may point in a variety of directions, so the Canny algorithm uses four filters to detect horizontal, vertical and diagonal edges in the blurred image. For each pixel in the result, the direction of the filter which gives the largest response magnitude is determined. This direction together with the filter response then gives an estimated intensity gradient at each point in the image.

The third stage of the Canny operation 32 is to search for non-maximum suppression. Given estimates of the image gradients, a search is then carried out to determine if the gradient magnitude assumes a local maximum in the gradient direction. From this stage referred to as non-maximum suppression a set of edge pixels, in the form of a binary image, is obtained. These are sometimes referred to as "thin edges".

The last stage of the Canny operation 32 is to trace edges through thresholds. Intensity gradients which are large are more likely to correspond to edges than if they are small. In most cases, however, it is unpractical to specify a threshold at which a given intensity gradient switches from corresponding to an edge into not corresponding to an edge. Therefore Canny uses two thresholds—one high threshold and one low threshold are preferred to be used. Making the assumption that important edges should be along continuous curves in the image allows us to follow a faint section of a given line and to discard a few noisy pixels that do not constitute a line but have produced large gradients. In the present embodiment, a high threshold is first applied. This would mark out the edge pixels that can be fairly sure as genuine. Starting from these edge pixels, using the directional information derived in previous stages, edges can be traced through the image. While tracing an edge, in the present embodiment, a lower threshold is applied so that as long as a starting point is found, faint sections of edges can be traced.

Once this last process of the Canny edge operation 32 is complete, a binary image is obtained where each pixel is marked as either an edge pixel or a non-edge pixel. From complementary output from the edge tracing step, the binary edge map 310 obtained in this way can also be treated as a set of edge curves, which after further processing can be represented as polygons in the image domain.

The Canny edge algorithm can be implemented using computer software developed from scratch. Alternatively, software incorporating Canny edge detection algorithms are commercially available and may be used in performing the Canny edge detection step of method 10, such as the open-source Computer Vision library ("OpenCV"), which contains general-purpose software routines for computer-vision applications. In the present embodiment, the Canny edge operation 32 is performed by an OpenCV software.

Another operation that performs pixel-level operation is called text texture operation 33. Along with locating connected components and determining which of those make up text lines, where the text inside the document lies can be determined by looking at different areas of the image and analyzing their properties. Those regions which have text-like properties are considered more likely to be located on the inside of the document, while those that have non-text-like properties and do not look like document background are more likely to be located outside of the document. Similar to the method that human vision uses to perceive text, texture-based filtering is able to recognize areas in a document having the properties of symbolic text without needing to first know what those symbols mean. Even in cases where connected components might fail, the text texture operation 33 should be able to distinguish the document text.

Figure 8A:
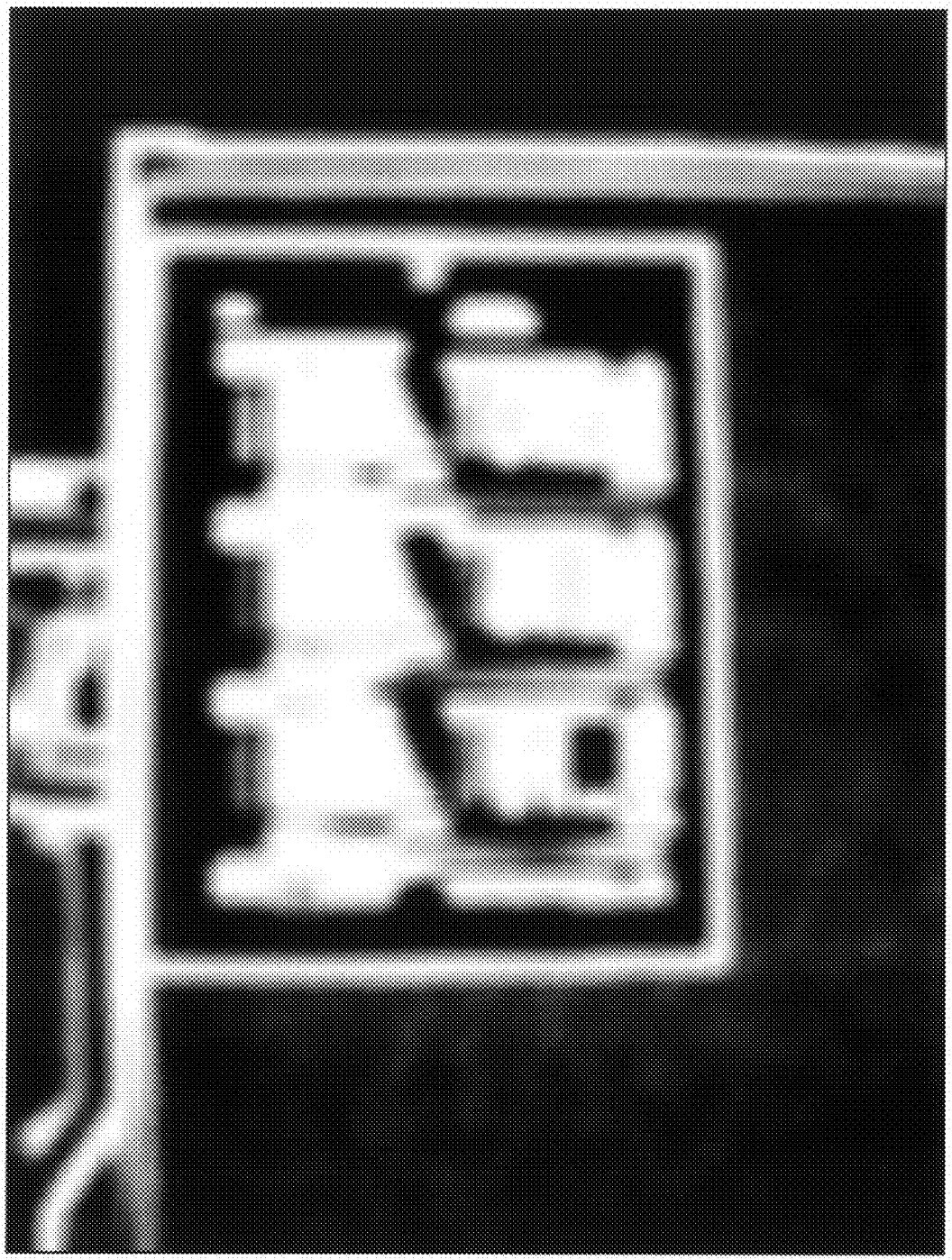
FIG. 8A shows a texture response derived from the digital image of FIG. 3A using an exemplary texture-based filtering technique according to an embodiment of the present application.
Figure 8B:
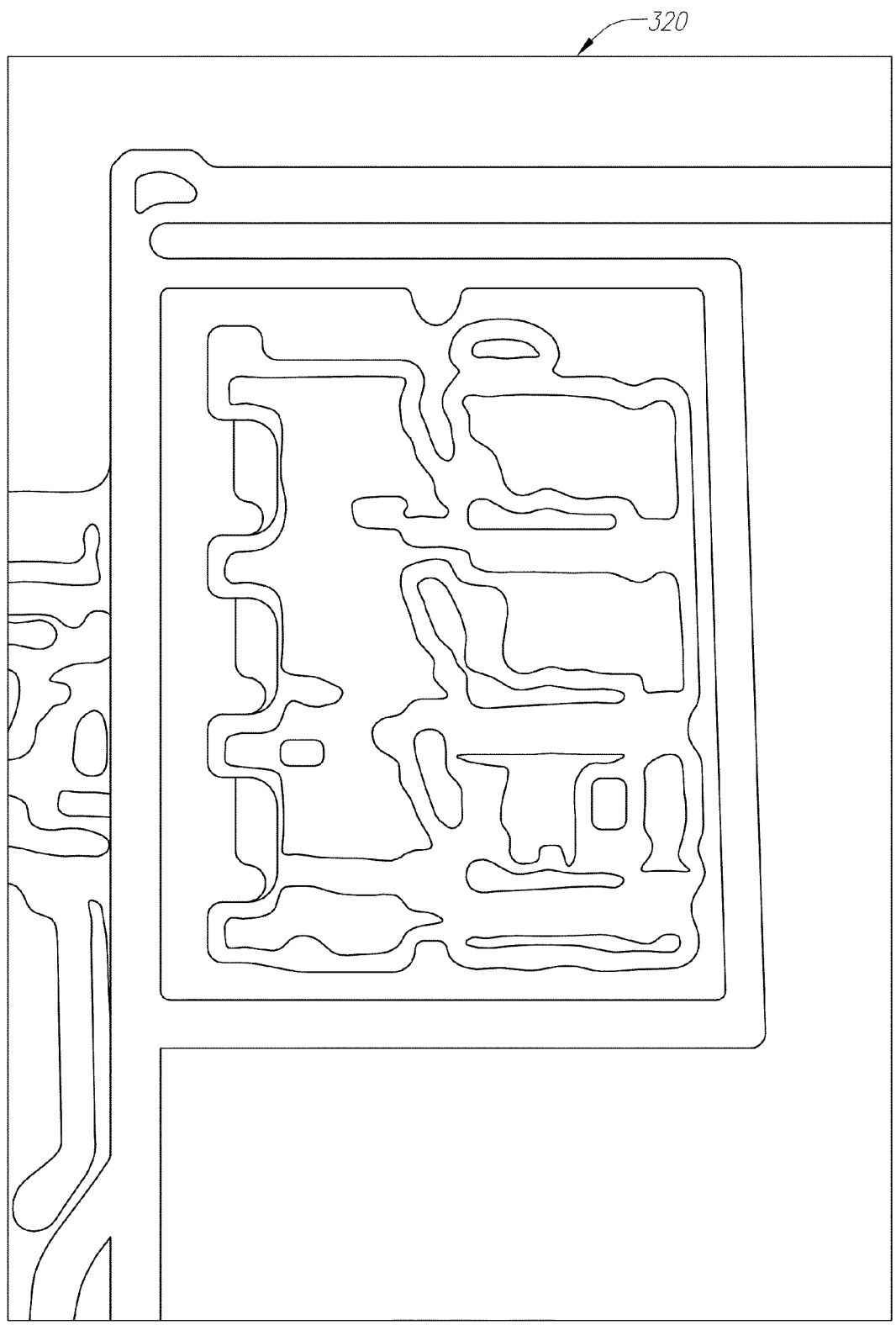
FIG. 8B is a schematic representation of FIG. 8A.

The process of text texture operation 33 is described in the following steps. Consider blocks of the image, combine the pixels and color channels through a filter, and output the filter response. The difficulty in using it for identification purposes lies in figuring out what filters to use and how to combine responses. In the present embodiment, pixels in an n×n grid are first identified, then a small rectangular area around those pixels are identified. The text texture operation 33 then runs a simple filter on this area. In the present embodiment, a nave function which finds the variance of the pixel intensities is used and then a blur to these variance results is applied. Text typically has a very high level of variance, the areas with high variance are labeled as text-like and, thus, having higher confidence. On the other hand, those that have low variance are labeled as being non-text and, thus, lower confidence. FIG. 8A shows a texture response of the image of FIG. 3A derived from variance of image regions. FIG. 8B shows a schematic drawing 320 of FIG. 8A.

Figure 7A:
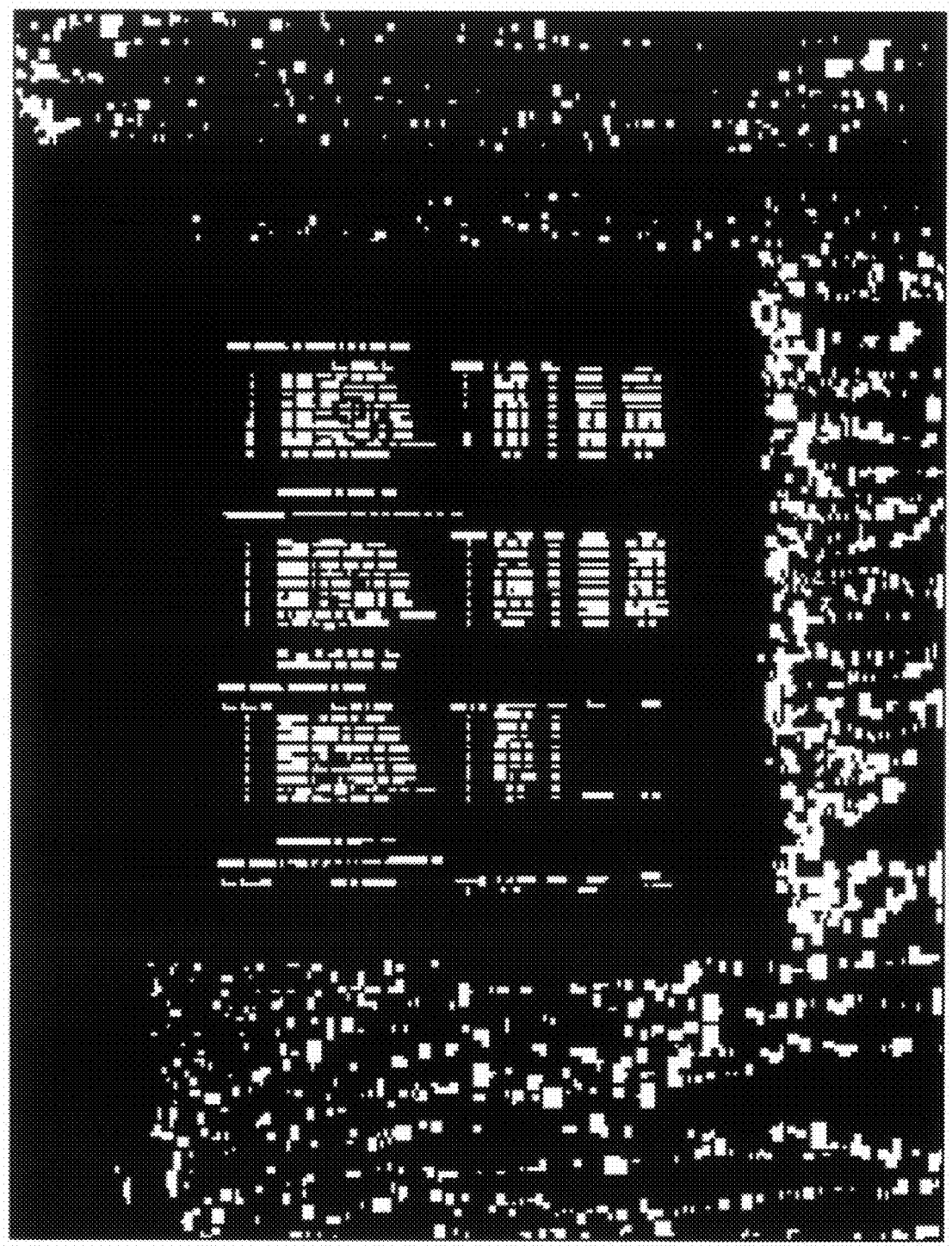
FIG. 7A shows a confidence map generated from the digital image of FIG. 3A using a lines of text operation.
Figure 7B:
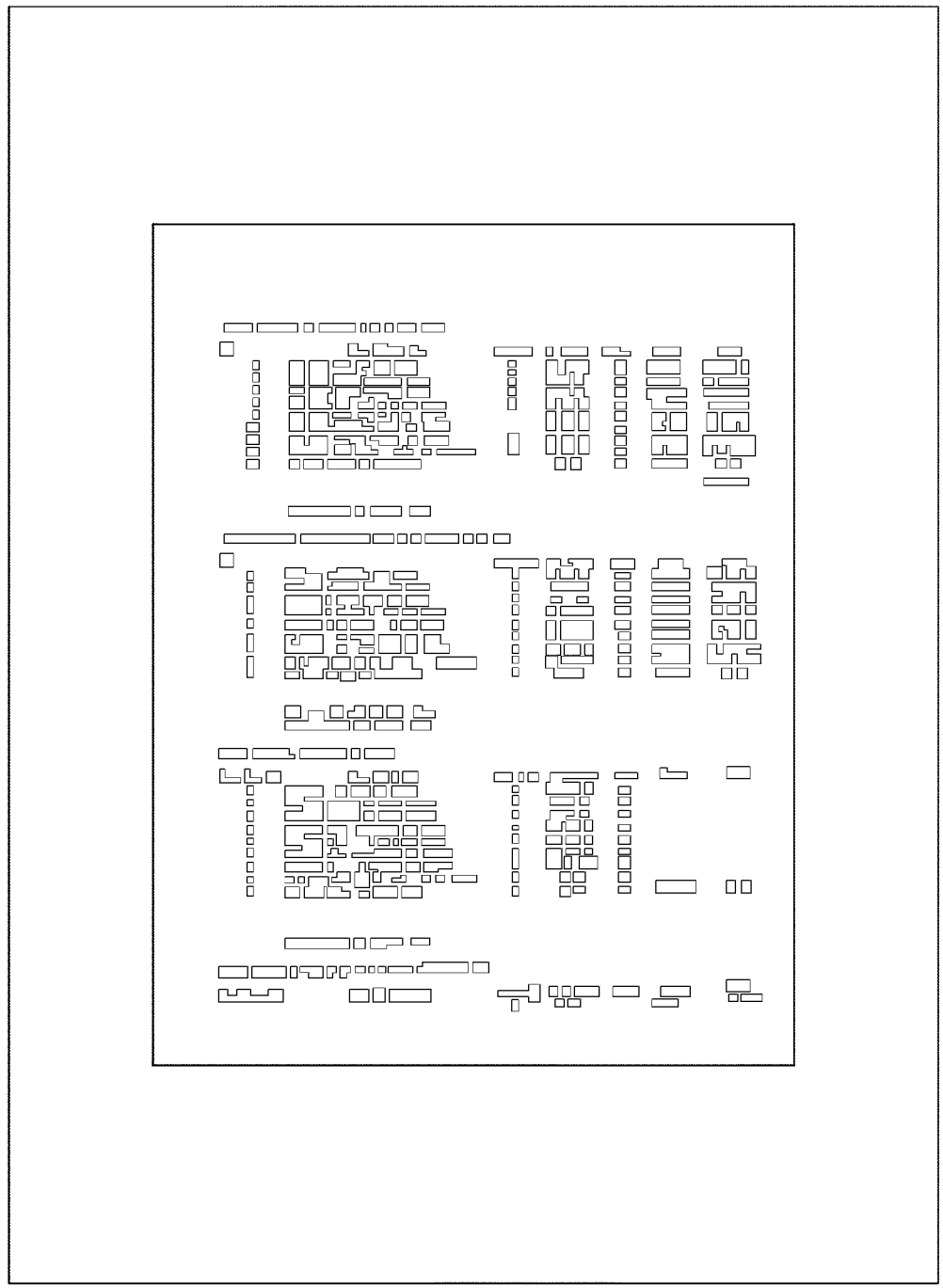
FIG. 7B is a schematic representation of the confidence map of FIG. 7A.
Figure 9:
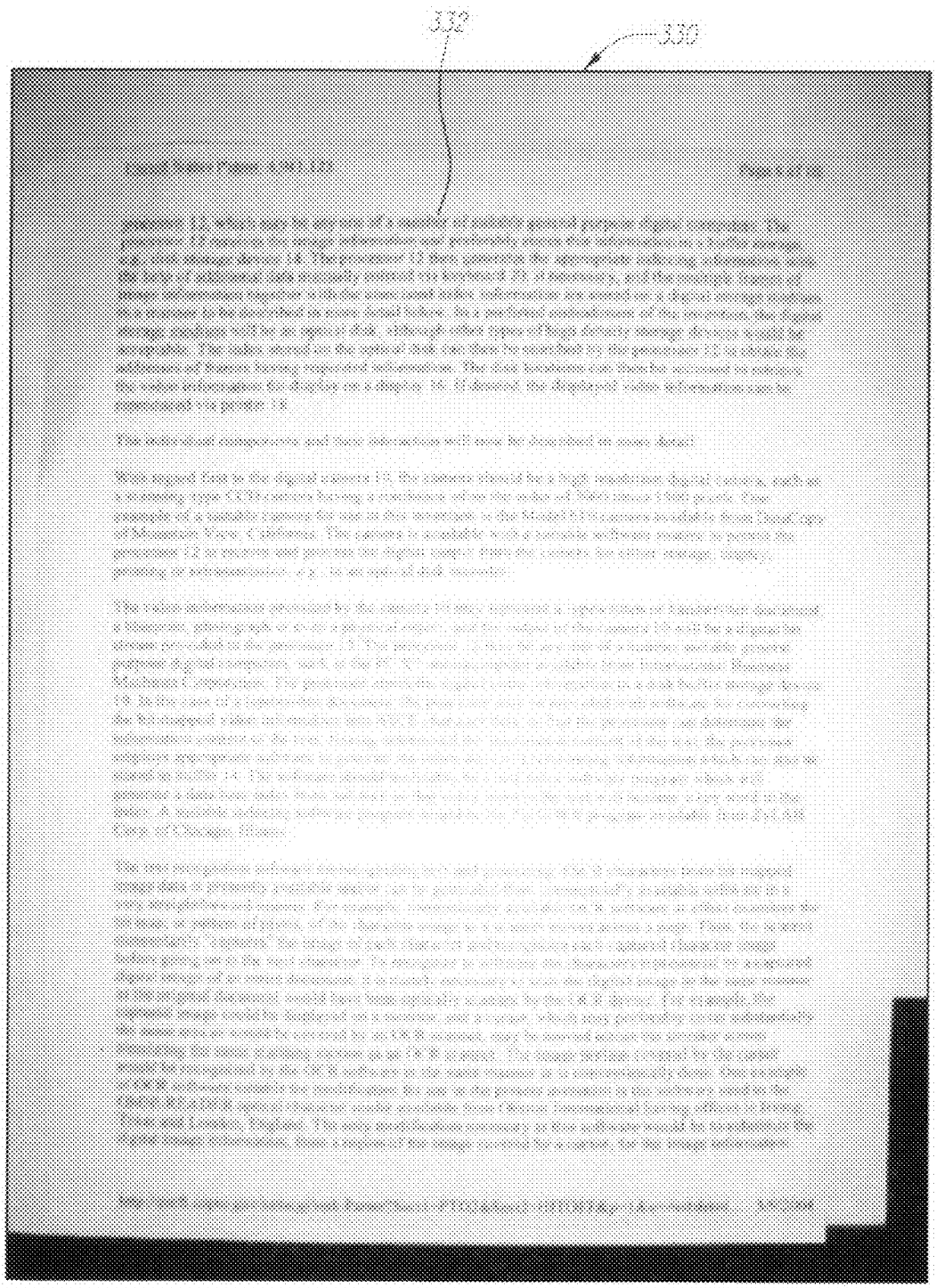
FIG. 9 shows a digital image suitable for finding lines of text using a connected components analysis, but which would be difficult for other segmentation methods to properly segment due to its varied background and the fact that there are no clear straight edge lines in the image.
Figure 10A:
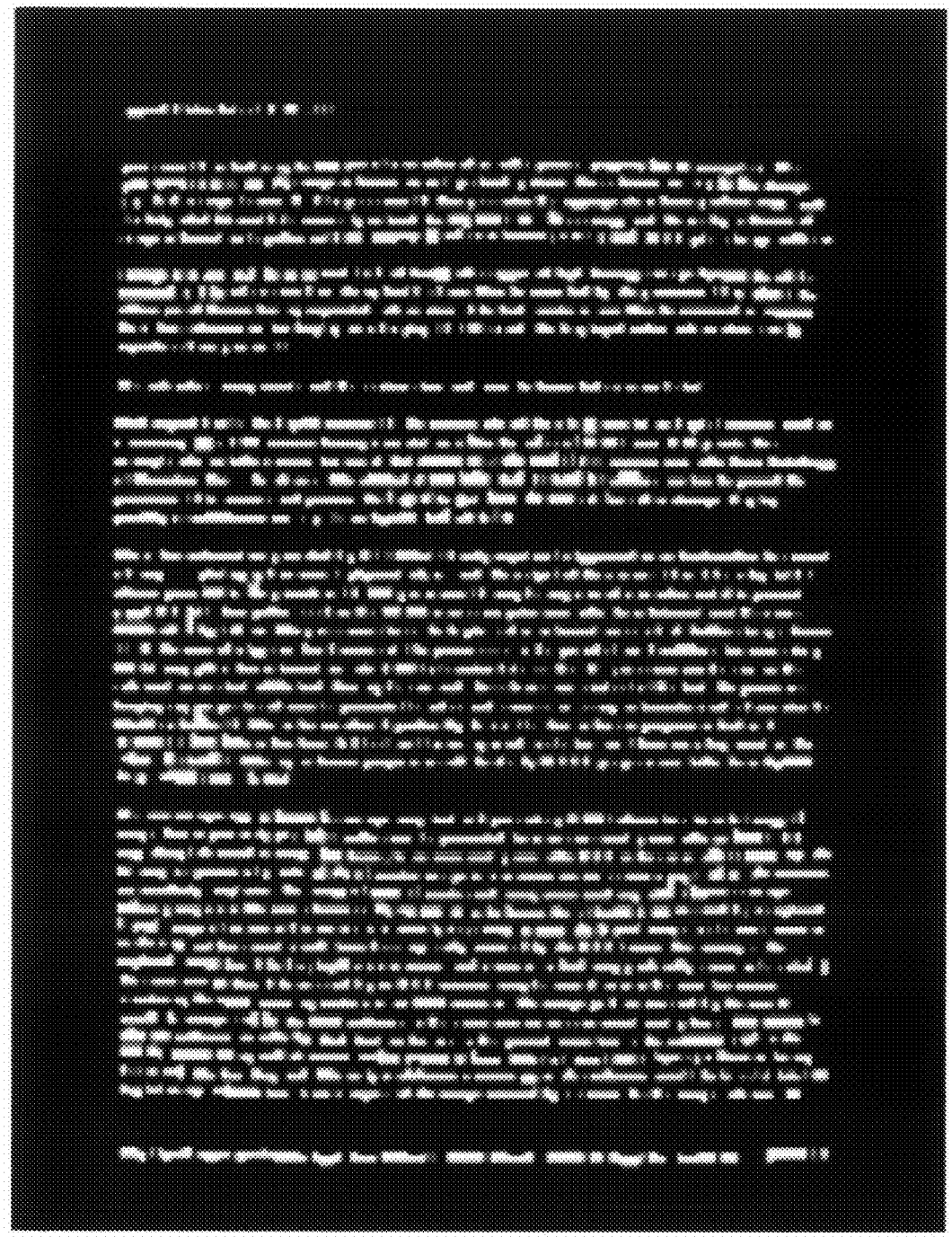
FIG. 10A is a confidence map of found text in the digital image of FIG. 9.
Figure 10B:
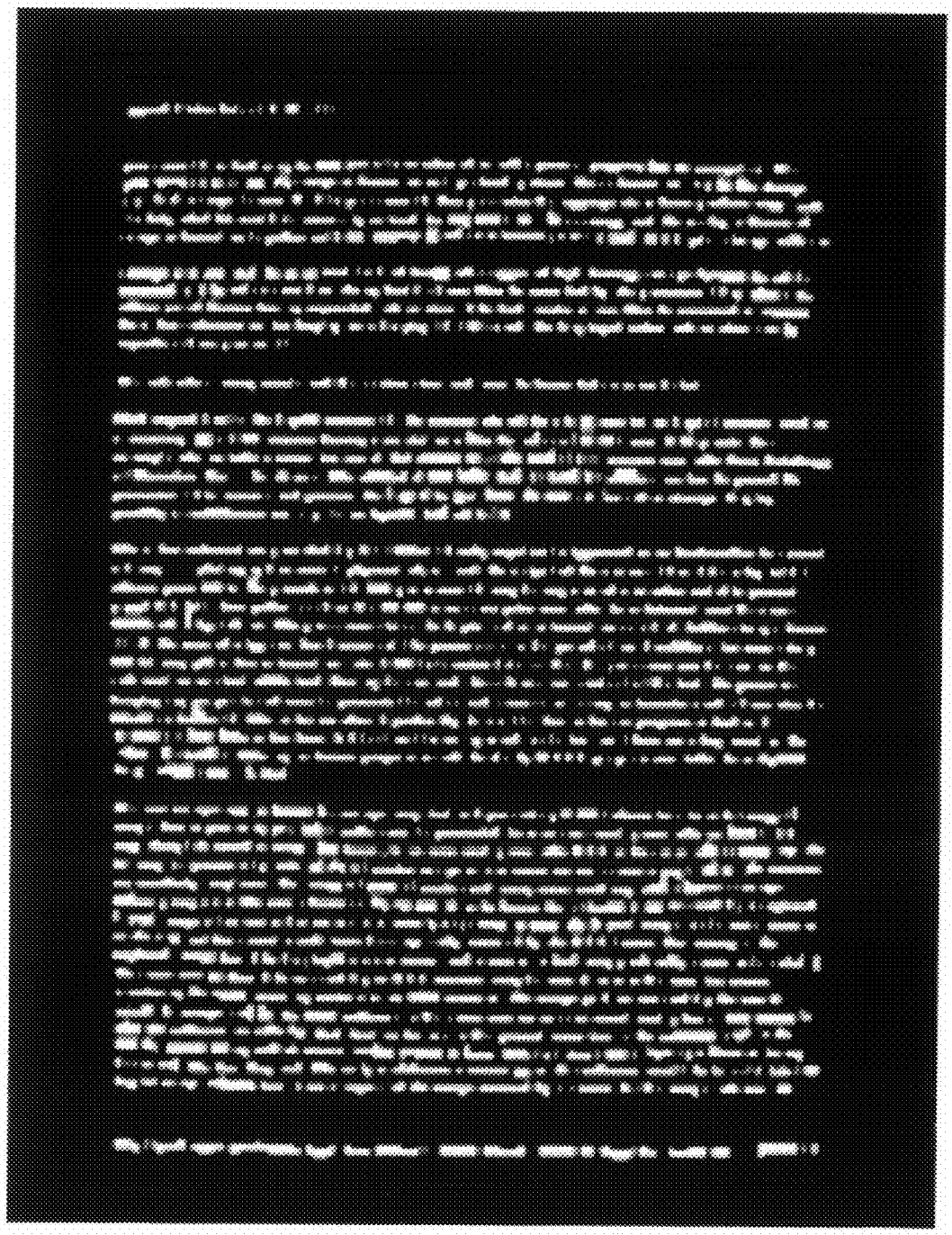
FIG. 10B is a schematic representation of FIG. 10A.

Another method of extracting information about a text-containing image is to look for the text itself. The lines of text operation 34 is able to locate connected components in the image. Connected components are image regions which have uniform color and pixels connected by adjacency. FIG. 7A shows a confidence map of the raw image of FIG. 3A derived from the lines of text operation. FIG. 7B shows a schematic drawing of FIG. 7A. For illustrative purpose, FIG. 7B is shown as a negative of FIG. 7A. FIG. 9 shows an image 330 suitable for finding line of text 332. Because the background is varied and there are no clear, straight edge lines, other segmentation methods will have trouble finding the document in the image 330. The lines of text 332, however, are quite distinct. FIG. 10A shows a confidence map of found text in FIG. 9. FIG. 10B shows a schematic drawing 340 of FIG. 10A. For illustrative purpose, FIG. 10B is shown as a negative of FIG. 10A.

Global edges operation 35 is another operation that performs pixel-level processing 30. In one embodiment, the output of the global edges operation 35 goes only to the RANSAC operation 45. That will be described in more detail in connection to the paragraph related to RANSAC.

The operations 31-35 of the pixel-level processing 30 have been described previously. Their outputs from the pixel-level operations 31-35 will be further processed in the edge-level processing step 40. Operations of the edge-level processing step 40 will be described below.

In the embodiment of FIG. 2, after the pixel processing operations 31-34 are completed, an edge-growing operation 41 for edge-level processing is performed to find possible document edge lines. The operations of the Sobel edge pixel detecting operation 31, the Canny edges detecting operation 32, the text texture operation 33, the lines of text operation 34 and the edge growing operation 41 can be further called an edge finding and grouping process 36. This edge finding and grouping process 36 is used to find potential edges of an imaged document by at least two different computer implemented edge detection techniques and then group the found potential edges into top, bottom, left and right side potential edge groups. Edge lines gathered from multiple sources increases the chances of having the best fit segmentation edges within a later stage of collection of possible edge lines.

In edge-growing operation 41, first, a confidence map was used to generate binary code on it by using the technique of iterative threshold. This produces a pure black and white image, where the white sections indicate that there is a higher probability of those pixels being included within the actual document under segmentation.

Figure 11A:
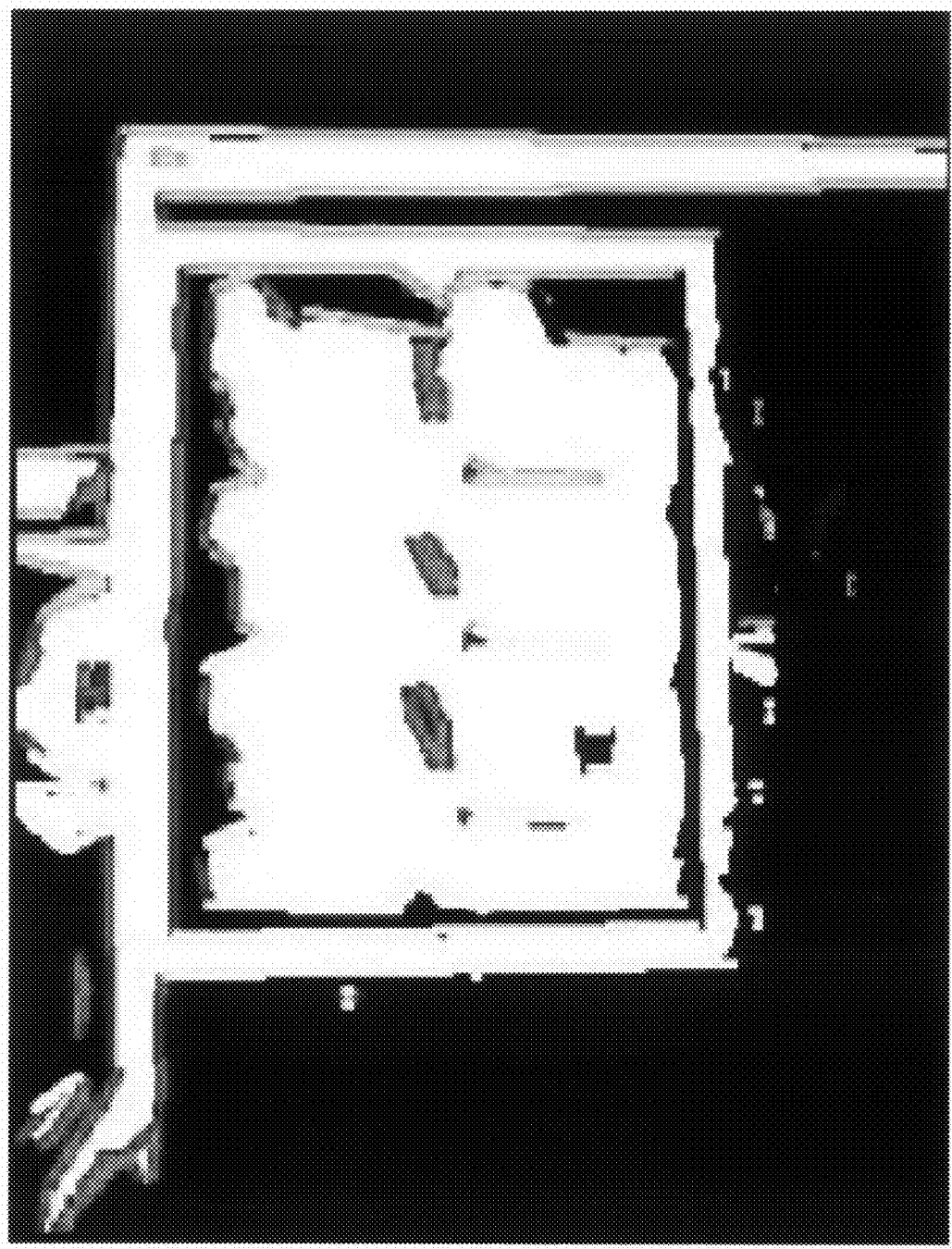
FIG. 11A illustrates the edges found by applying an edge growing technique to a confidence map, which is reflective of the methods certainty that an edge is present, and which was generated by averaging the filter responses shown in FIGS. 6A and 8A together.
Figure 11B:
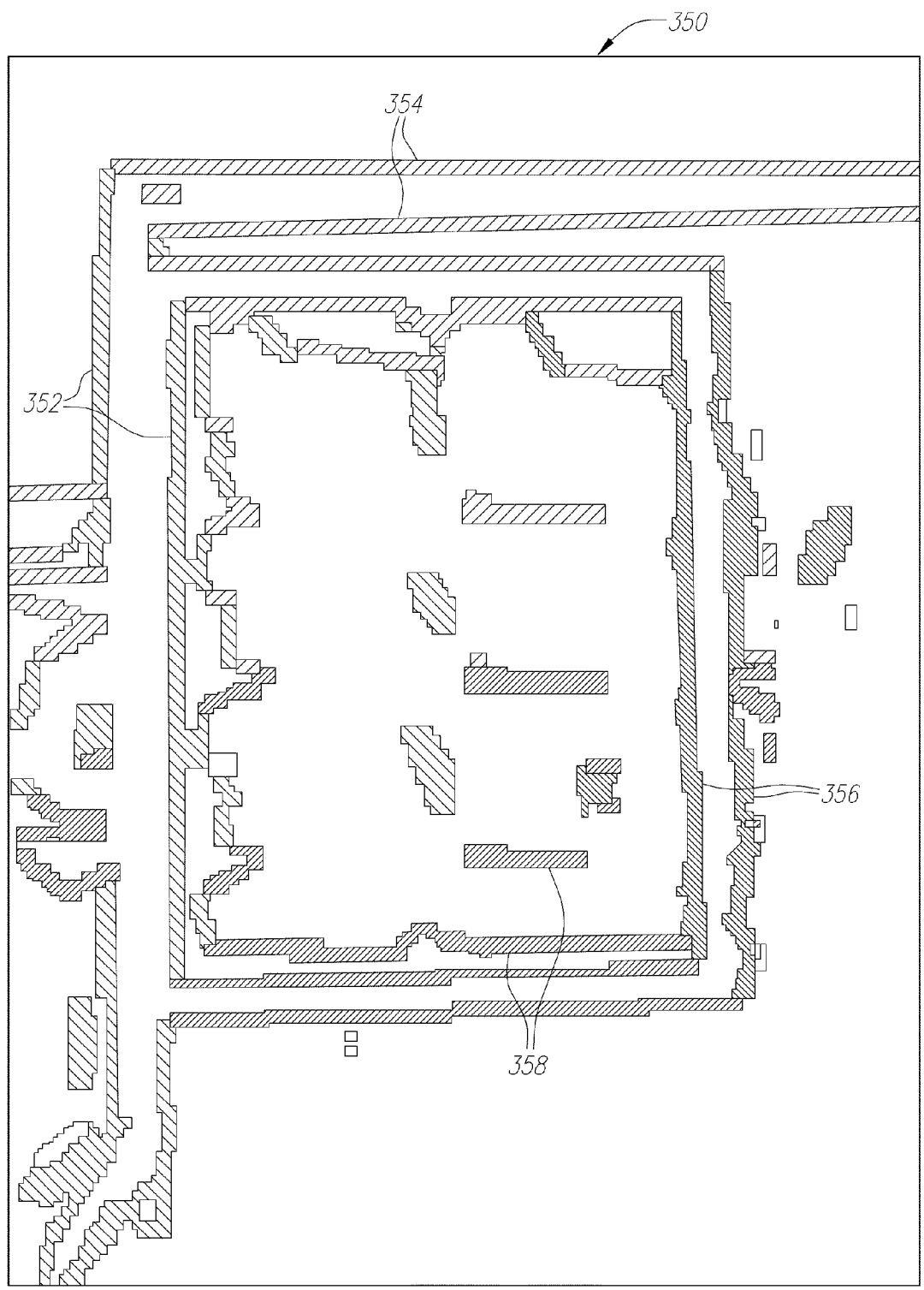
FIG. 11B is a schematic representation of FIG. 11A.

In order to find edges within a pure black and white image, in one embodiment, all possible pairs of contrasting points were searched in a specific direction, such as left-to-right or top-to-bottom, until a transition from a black pixel to a white pixel is found. Then, points within close proximity to this location that exhibit contrast transitions in the same direction were identified. If any point was identified with these properties, i.e. the white point of the black-to-white pair, it is appended to the original point. Repeating the above process results in a set of points on edges as shown in FIG. 11A which shows the result of edge growing operation 41 from the raw image of FIG. 3A. FIG. 11B shows a schematic drawing 350 of FIG. 11A. From FIG. 11B, some top edges 354, left edges, 352, bottom edges, 358 and right edges 356 can be formed from the set of points on edges.

The edge growing operation 41 makes it possible to extract edge lines with particular properties, such as long straight lines. Since edge lines were grown one point at a time, a candidate edge point can be checked whether it would change the overall angle of the existing edge lines. If added points alter the angle of an edge, the edge growing process would be stopped, which results in a straight line free from hooks and corners. In the present embodiment, edge lines were grown on confidence maps with lower resolutions than its original image. The lower resolutions smooth the image so that the amounts of hooks or jagged edges can be minimized. Besides, working with smaller image sizes also speeds up the computation time. Yet, the grown edge lines must be scaled up to the original image size before further processed in the next step. During the process of scaling down the image for creating confidence maps and the process of scaling up the edge lines for fitting the original image, some edge lines are transposed away from their correct locations. Edge lines that should be lying directly along an actual document edge are slightly off in one direction. This issue will be solved later in the edge processing step 40.

Figure 12A:
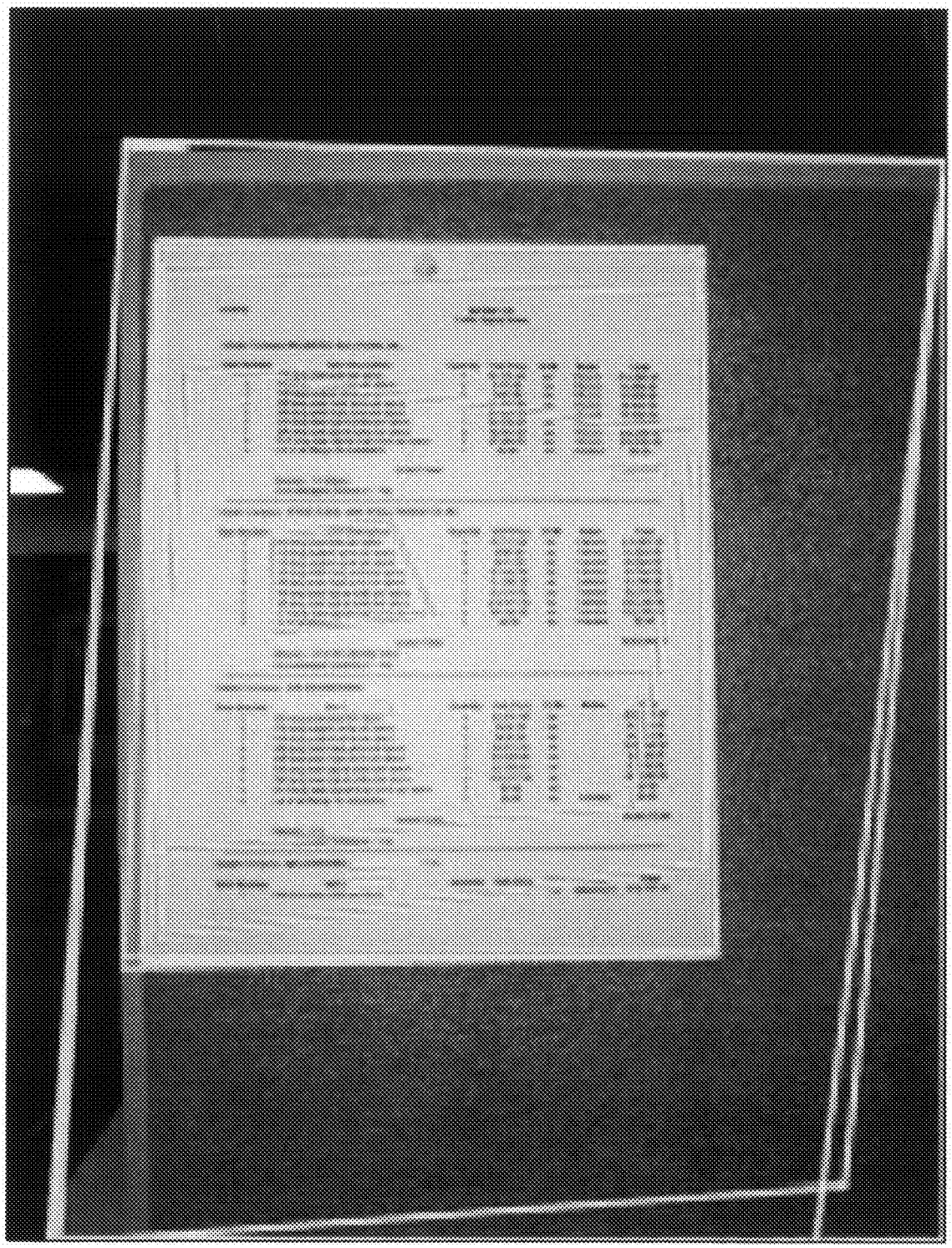
FIG. 12A shows the output from the Canny detector and quadrilateral-finding routine included in the open source Computer Vision library ("OpenCV") for the digital image of FIG. 3A.
Figure 12B:
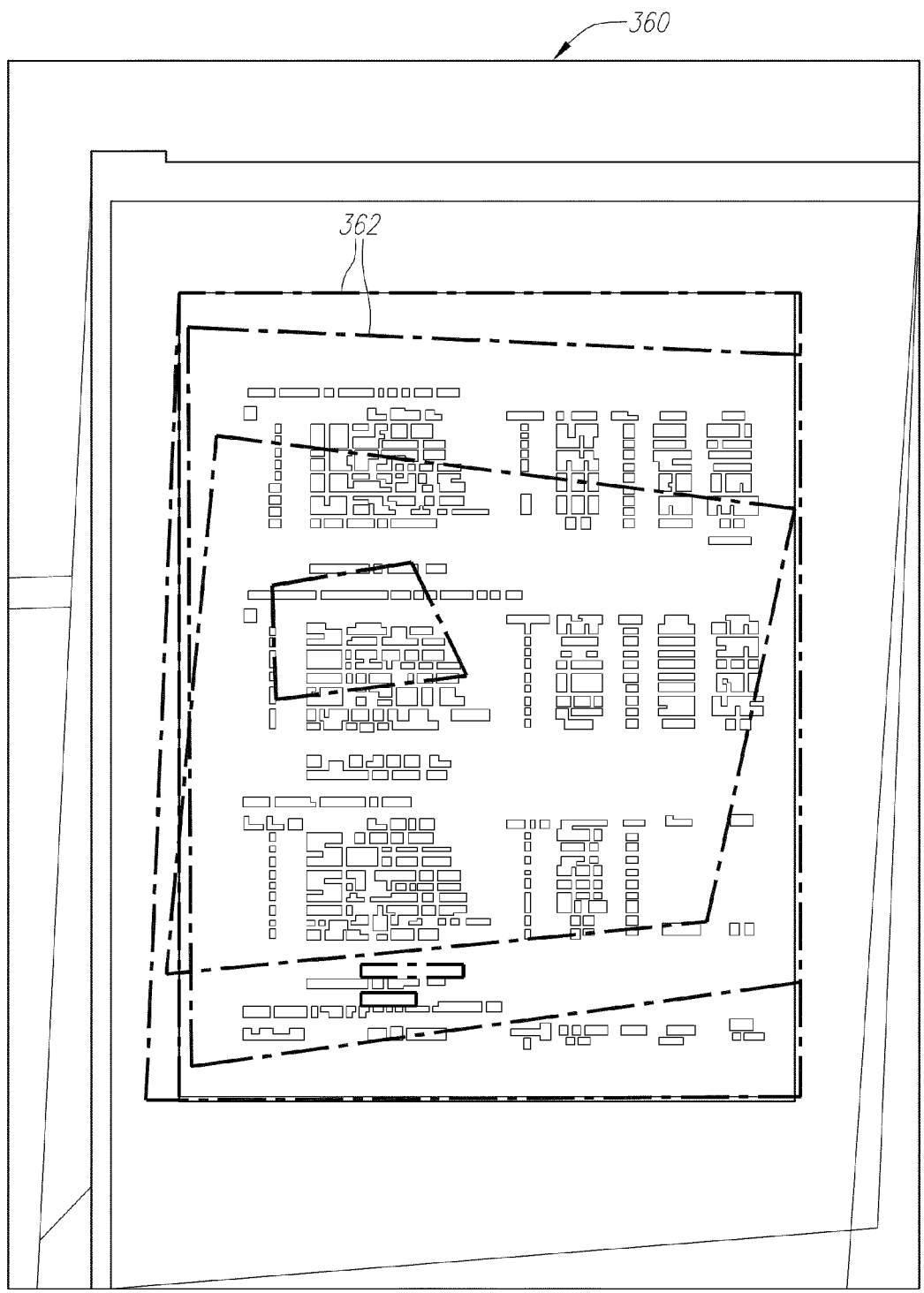
FIG. 12B is a schematic representation of FIG. 12A.

Given that the edges of imaged document 222 will be defined by four potential edge lines, quadrilaterals can be formed from edge lines found using the Canny detection algorithm using a quadrilateral finding routine. In the present embodiment, a quadrilateral finding routine from OpenCV is used. FIG. 12A shows sets of quadrilaterals found on the image of FIG. 3A. FIG. 12B shows a schematic drawing 360 of FIG. 12A where quadrilaterals 362 are found. This routine will be used in the determining step 50.

RANSAC 45 is an abbreviation for "RANdom SAmple Consensus." It is an iterative method to estimate parameters of a mathematical model from a set of observed data which contains outliers. The RANSAC algorithm is well-known. In the present embodiment, the global edge operation 35 and the RANSAC 45 will be described together in more detail below. A basic assumption is that the data consists of "inliers", i.e., data points which can be explained by some set of model parameters, and "outliers" which are data points that do not fit the model. In addition to this, the data points can be subject to noise. The outliers can come, e.g., from extreme values of the noise or from erroneous measurements or incorrect hypotheses about the interpretation of data. Another assumption is that, given a (usually small) set of inliers, there exists a procedure which can estimate the parameters of a model that optimally explains or fits this data.

Figure 13:
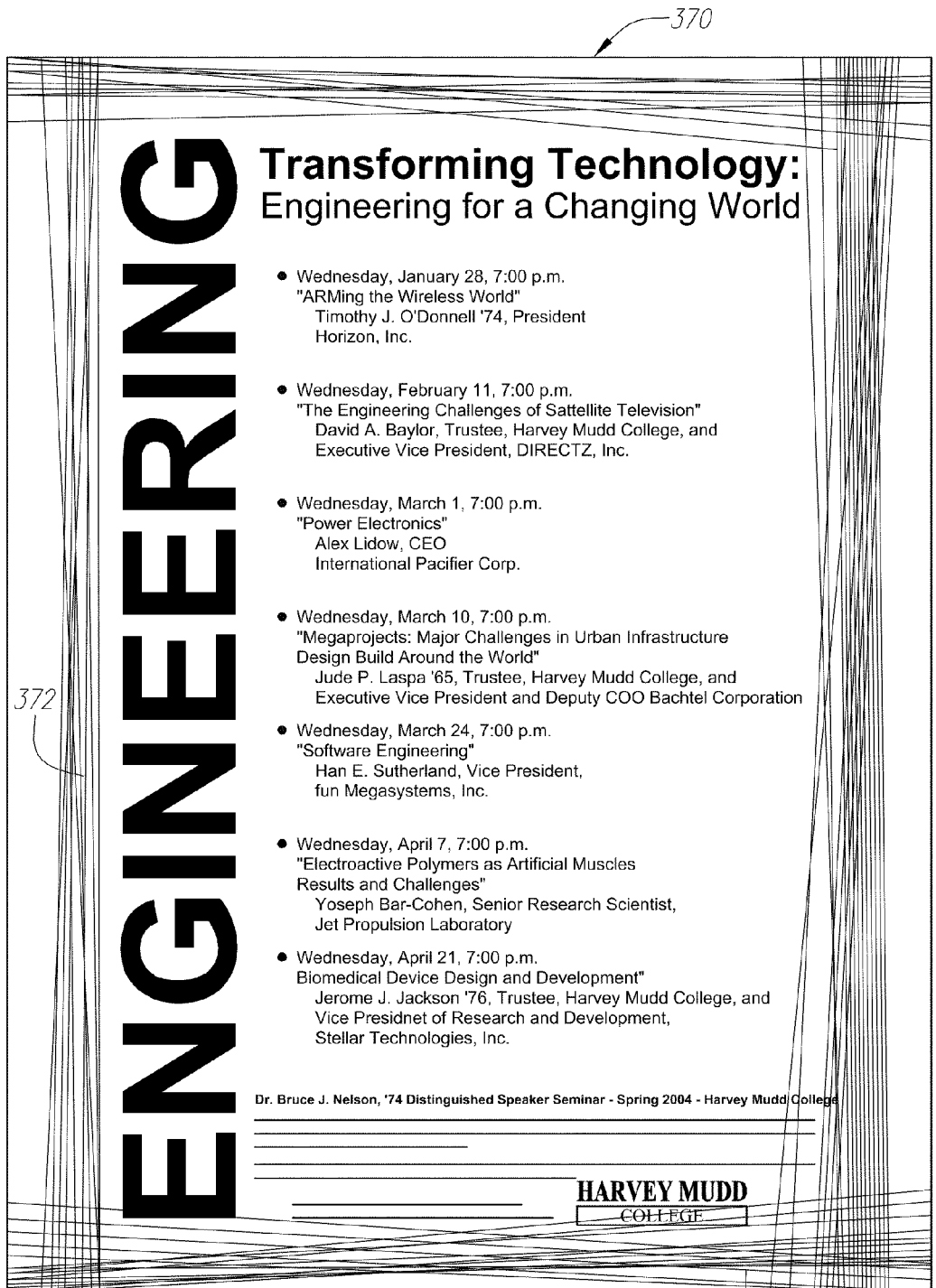
FIG. 13 is a schematic useful for describing a RANSAC segmentation process that may be used to generate an edge set for use in the method illustrated in FIG. 2.

In one embodiment, the system finds edge lines by making horizontal and vertical scans between the center and edges of the image, and looks for the border between document pixels and background pixels. It then samples pairs of these points, creating thousands of potential edge lines. Then, it groups edges according to their angle and distance from the center, and the largest of these clusters in each direction are determined to be the top, bottom, left, and right edges of the document. An example can be seen in FIG. 13 which shows an exemplary raw image 370 containing a document image with RANSAC edge lines 372 before grouping.

Figure 14:
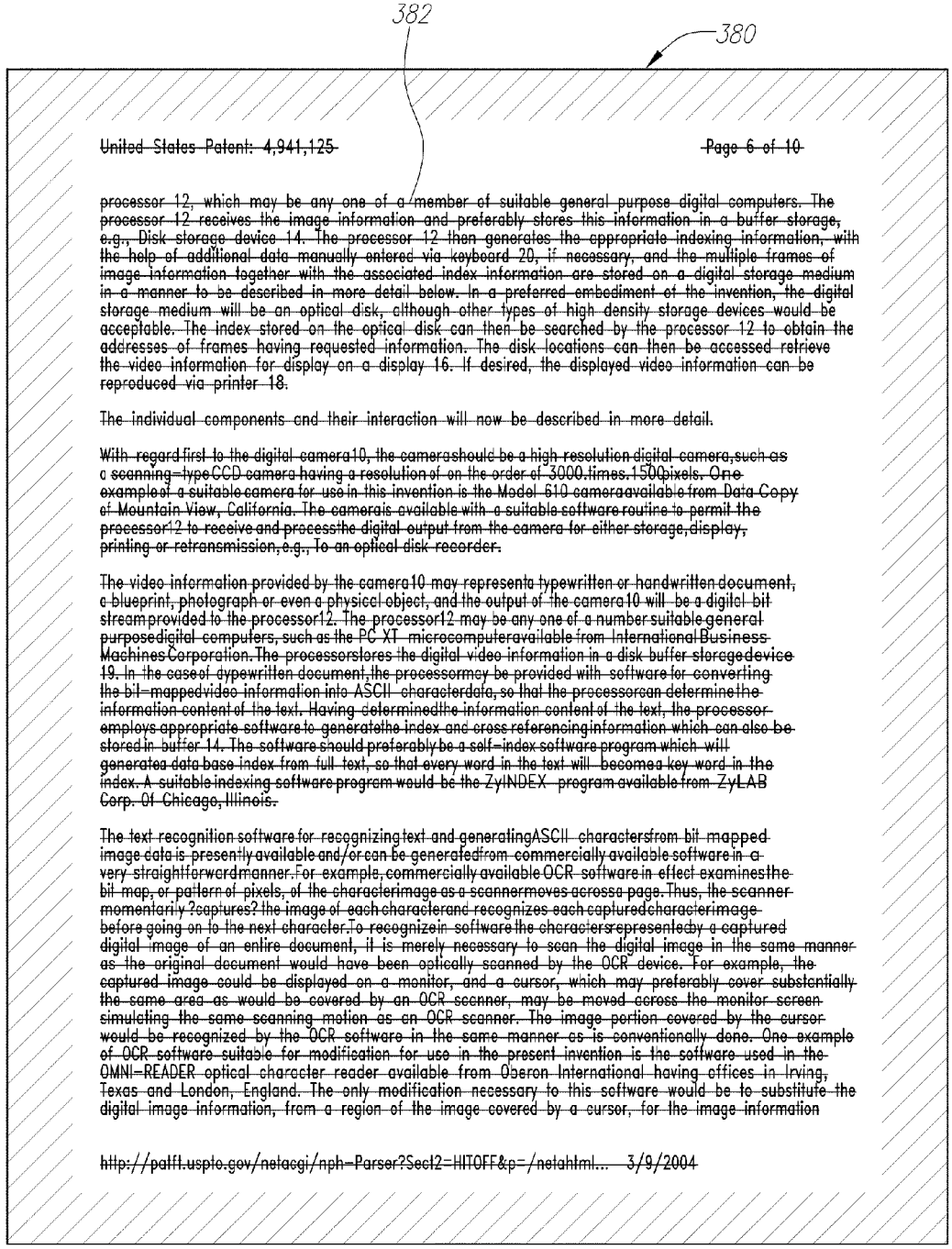
FIG. 14 schematically illustrates text lines found using a lines of text analysis on the digital image of FIG. 9.

The text box operation 44 is an edge-processing step 40 that takes the output from the lines of text operation 34. The text box operation 43 identifies connected components in an image and then links those connected components together that have text-like properties. A list of lines would, thus, be generated, which under normal circumstances would correspond to the lines of text in the document. In one embodiment, the lines found in text box operation 43 are analyzed to find the region of the image containing text. First, an average angle for the text is calculated. Then, using that angle, the lines farthest away from the center in each direction can be obtained. By extending lines at that average angle from the top-most and bottom-most points found to contain text, and intersecting them with the left and right-most lines, a rectangle can be formed that frequently represents a reasonable approximation of the document region. Since the purpose of this operation 43 is to find the text box, the edges found in this step is the edges of the text box instead of the document edges. However, the edges help determining the orientation and define the worse case boundary. FIG. 14 shows the exemplary image 380 of FIG. 9 with lines of text 382. FIG. 15 shows a segmented text box 392 of the image 390 of FIG. 9.

Figure 16:
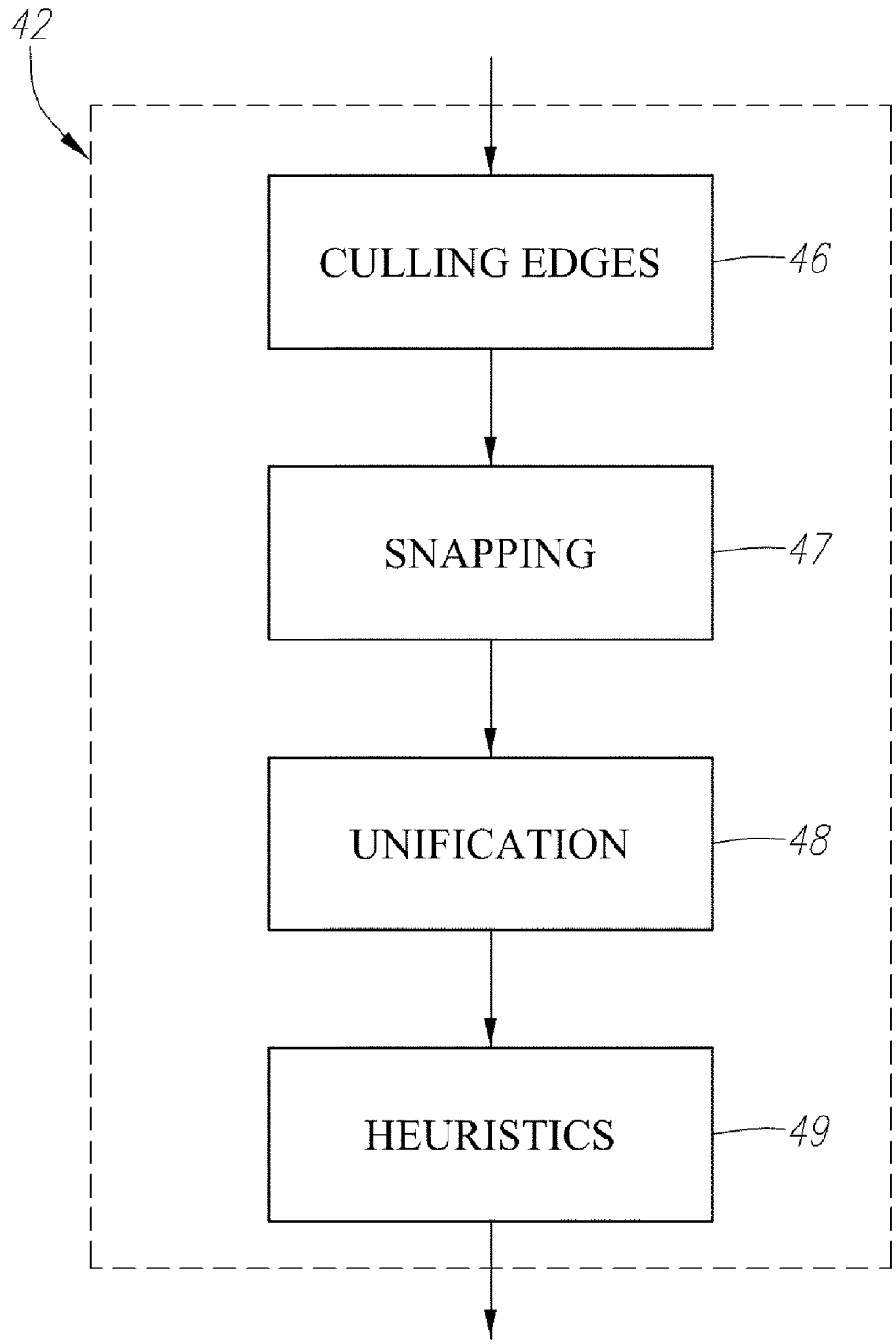
FIG. 16 shows a flow chart of exemplary edge selection steps.

Once the process of edge growing operation 41 is completed, in the present embodiment, edge lines from three different sources 31, 32, 33 are further processed in the edge selection operation 42. FIG. 16 shows a flow chart of the edge selection operation 42 in the present embodiment where a sequence of procedures 46-49 are performed to collect the best edge lines.

Figure 17:
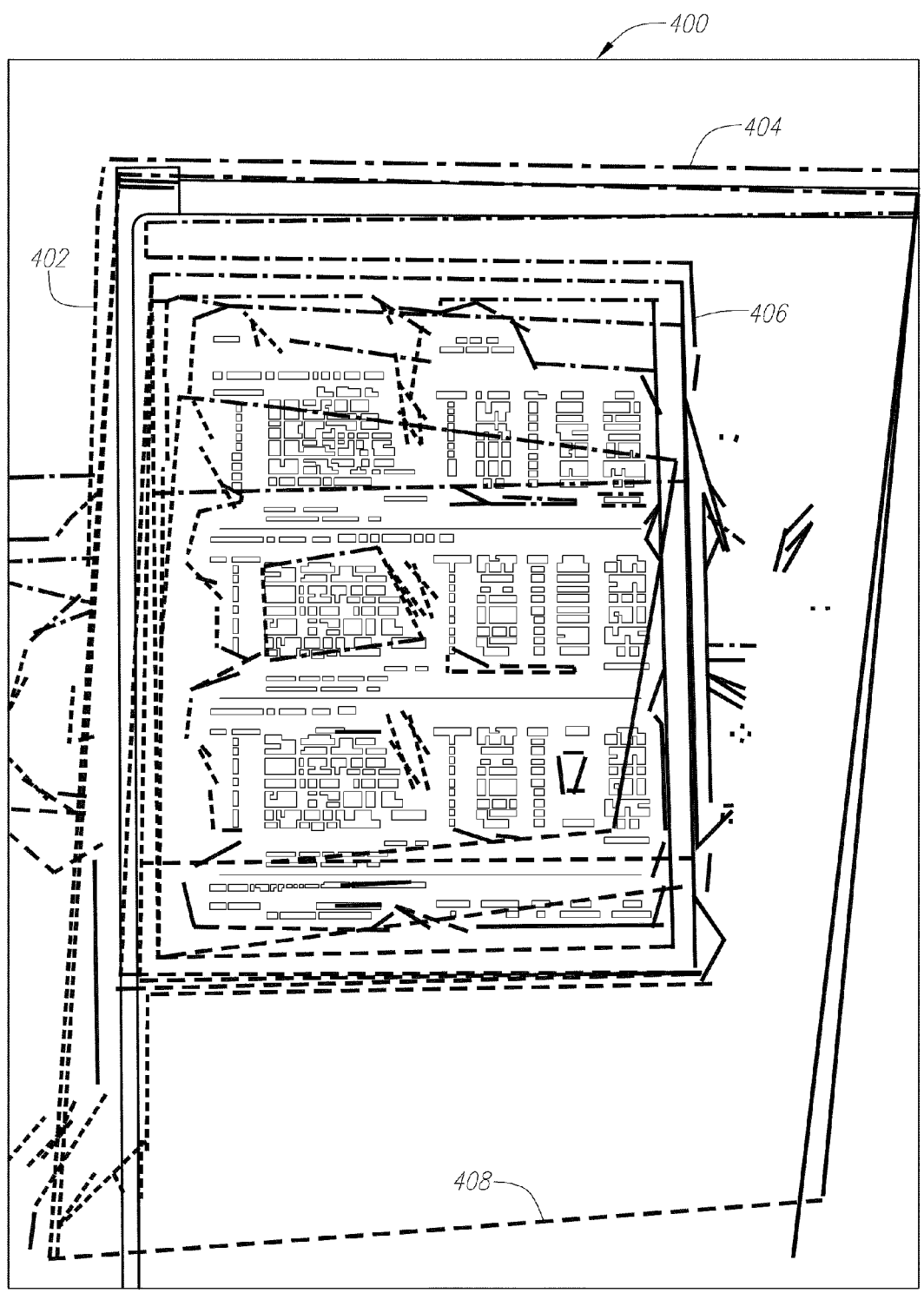
FIG. 17 is a schematic representation of all potential edges found for the digital image of FIG. 3A through edge growing and OpenCV.
Figure 18:
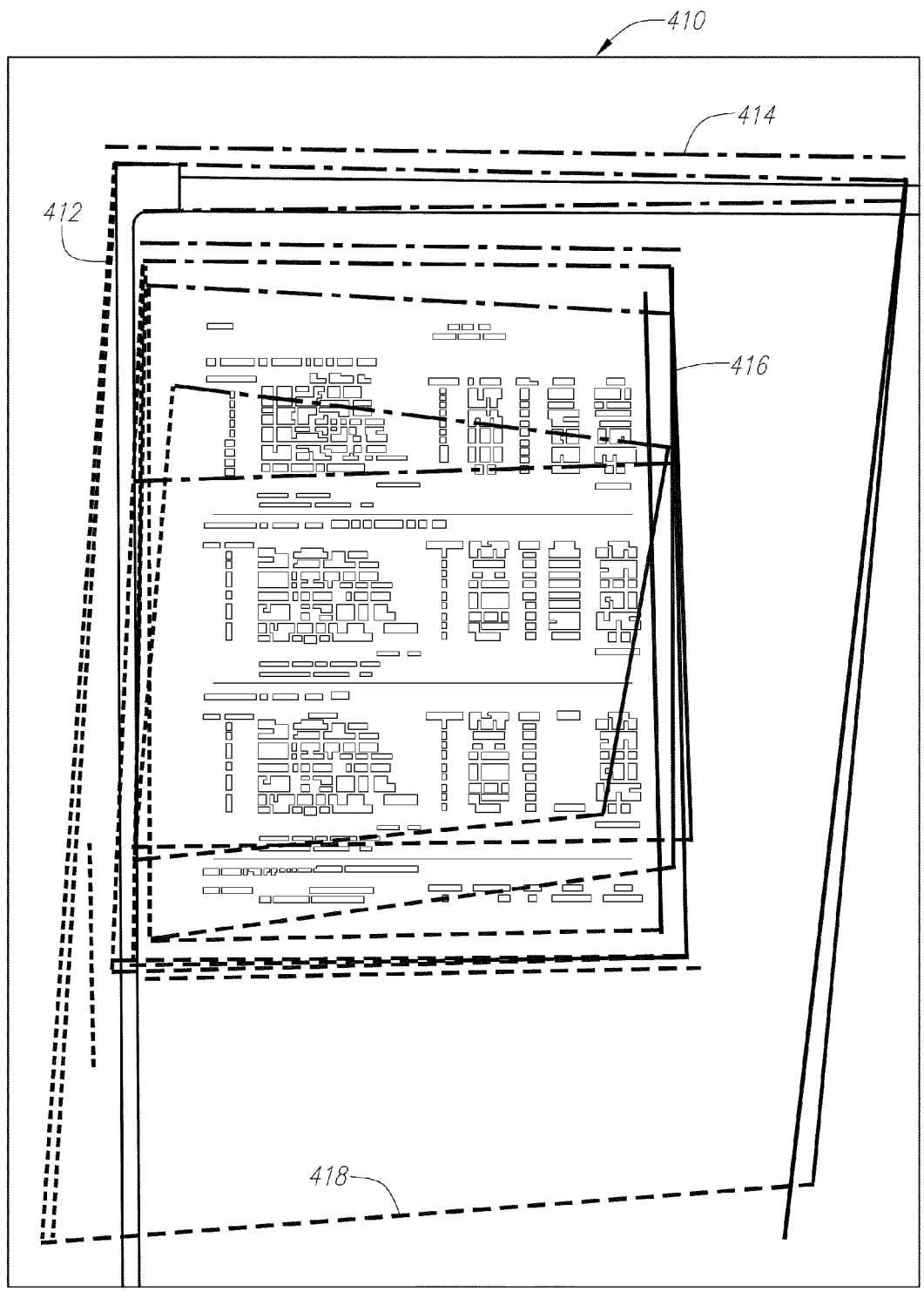
FIG. 18 is a schematic illustration illustrating potential edges that remain after one possible culling operation.

The first procedure in edge selection operation 42 in the embodiment of FIG. 16 is to remove any short edge lines from consideration, or culling edges operation 46. Edge lines with short length cannot be properly considered as document segmentation candidates. In the present embodiment, edge lines with a length less than one fifth of the minimum image side (either width or height) are considered as short edges. FIG. 17 shows a schematic drawing of edge lines 402, 404, 406, 408 found by the edge growing operation 41 according to the raw image 400 of FIG. 3A where small dash lines 402 represent left edge lines, double dash lines 404 represent top edge lines, solid lines 406 represent right edge lines, and large dash lines 408 represent bottom edge lines. From FIG. 17, short edge lines, for example, 406 are found by the edge growing operation 41. FIG. 18 shows a schematic drawing of remained edge lines 412, 414, 416, 418 after culling edge operation 46. From FIG. 18, the number of remaining edge line candidates are reduced and that would save time in subsequent edge processing steps.

Figure 19:
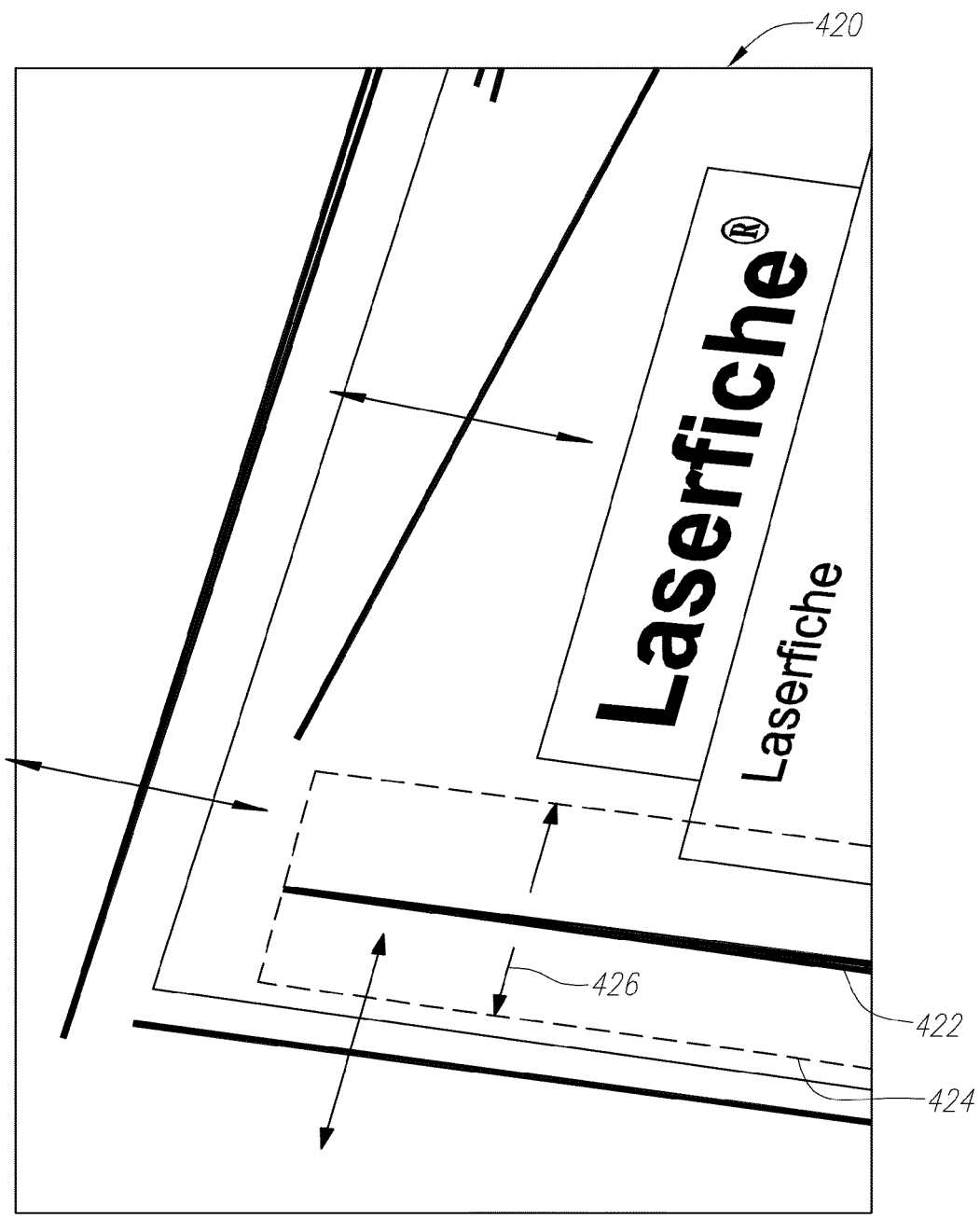
FIG. 19 is a schematic useful for describing a snapping technique that may be used in connection with the edge selection step of FIG. 2 to repair edge drift that may result during certain pixel-processing techniques that may be used to form confidence maps for use in the edge growing step of FIG. 2.

Edge lines gathered during the pixel processing operations 31, 32, 33 might be slightly off from the actual document edges. To fix this problem, the second procedure in edge selection operation 42 of the embodiment of FIG. 16 is to shift edge lines slightly to the line of best fit in close proximity, or edge snapping operations 47. FIG. 19 shows an example of how edge snapping works. In one embodiment, a window 424 (shown in a dashed box) is set up for each edge line 422 to be snapped. The length of the window 424 is the same as the edge line 422. The width of the window 424 is set to a predetermined value. If the main axis of the edge line 422 is defined as the same direction as the length direction of the window 424 and the minor axis 426 of the edge line 422 is perpendicular to the main axis, then there are plenty of line segments in the window 424 that along the minor axis 426 with a line length equal to the width of the window 424. Points within each line segment in the window 424 are evaluated along the minor axis 426 of the edge line 422. The contrast for each point on each line segments is computed. In the present embodiment, a penalty is applied to points that are farther away from the original edge 422. The point with the best contrast on each line segment is marked. All of the marked points from all line segment are gathered and a new edge line is computed by using least squares regression. If the contrast of the new edge line is better than the original edge line 422, the new edge line is used to replace the original edge line 422.

Figure 20A:
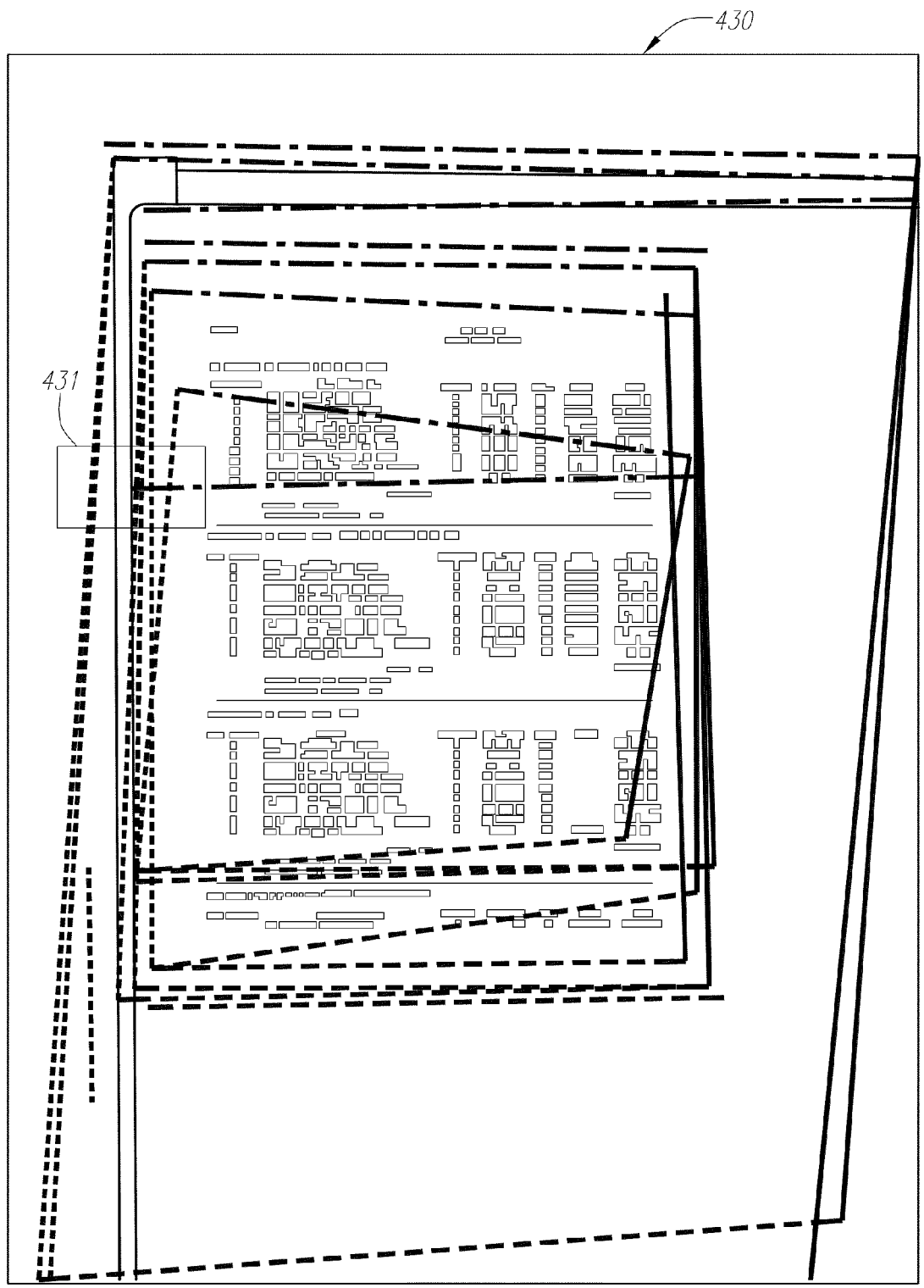
FIG. 20A is a schematic illustration illustrating potential edges that remain for the digital image of FIG. 3A after culling and before an edge snapping operation is performed.
Figure 20B:
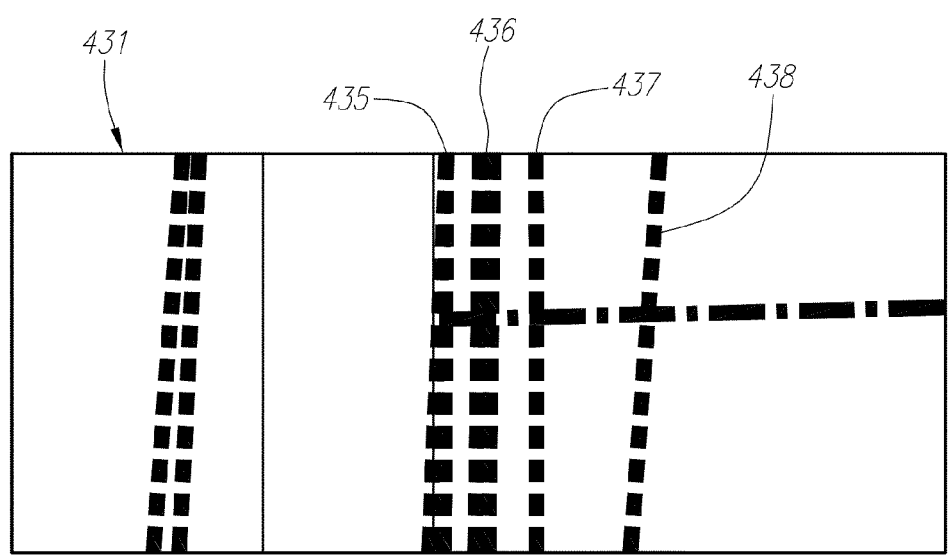
FIG. 20B shows an enlarged area in FIG. 20A.
Figure 21A:
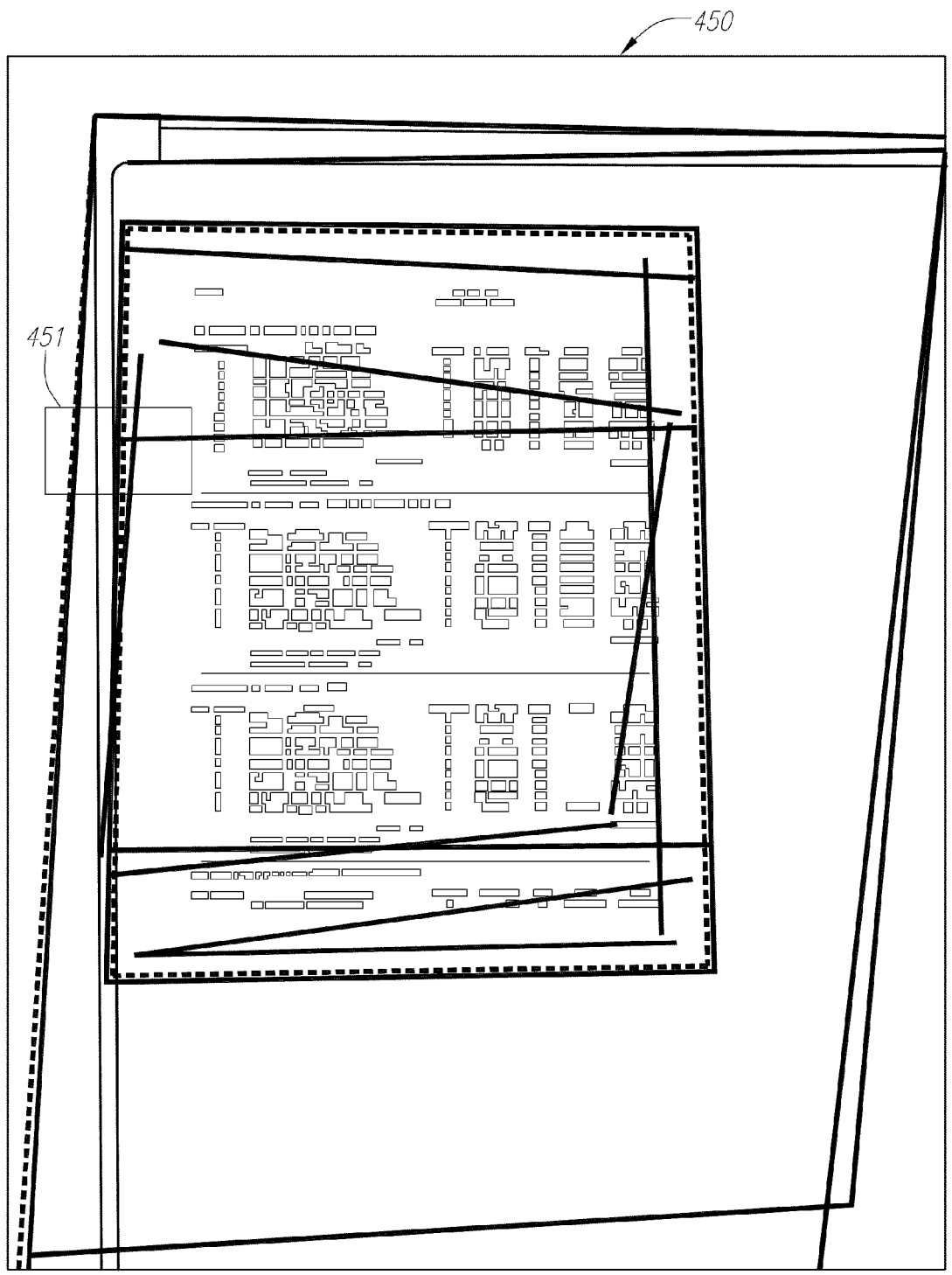
FIG. 21A is a schematic representation of the digital image of FIG. 3A showing the potential edge lines after the edge snapping operation.
Figure 21B:
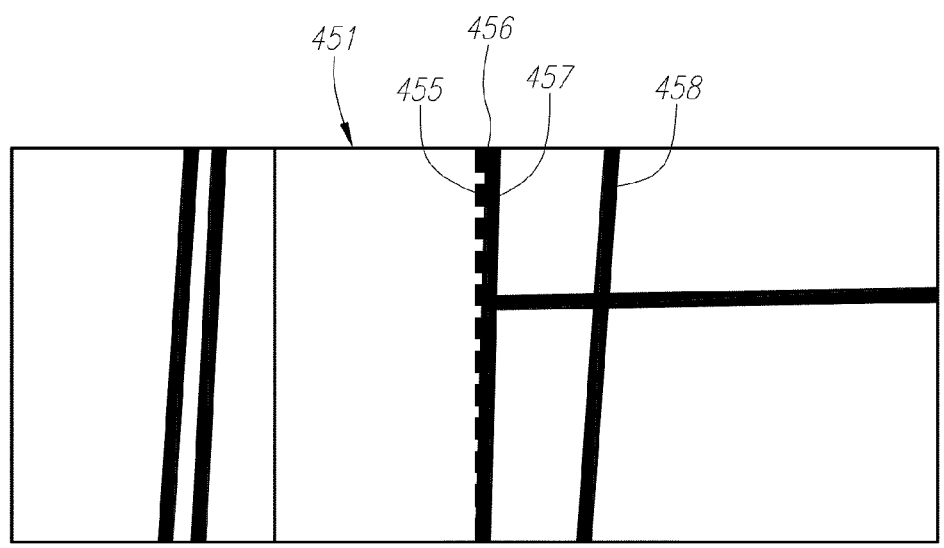
FIG. 21B shows an enlarged area in FIG. 21A.

Since a snapped edge line can also be slightly off from the actual edge line, the edge snapping operation 47 can be performed more than once. In the present embodiment, the edge snapping operation 47 is performed three times on each edge line but the window width is shorter after each run. After the initial snapping, the subsequent snaps would provide a better fit without drastically shifting the edge line. FIG. 20A shows a schematic drawing of an exemplary raw image 430 with edge lines before the edge snapping operation 47. FIG. 20B shows an enlarged area 431 in FIG. 20A with edge lines 435, 436, 437, 438 shown in detail. FIG. 21A shows a schematic drawing of an exemplary raw image 450 with edge lines after the edge snapping operation 47. FIG. 21B shows an enlarged area 451 in FIG. 21A. It can be seen from FIG. 21B that edge lines 455, 456, 457 are almost overlaying from each other. In other words, there are fewer distinct edge lines after the edge snapping operation 47.

The third procedure in edge selection operation 42 of the embodiment of FIG. 16 is called unification operation 48. Since edge lines are collected from different sources 31, 32, 33 to increase the chances of finding the correct segmentation edge lines, overlapping of collected edge lines could occurred. Overlapping of edge lines results in a less unique set of edge lines. Hence, the chances to find the correct segmentation would be reduced. By merging overlapping edge lines, the size of collected edge lines can be further reduced and the collected set of edge lines are more unique.

Figure 22A:
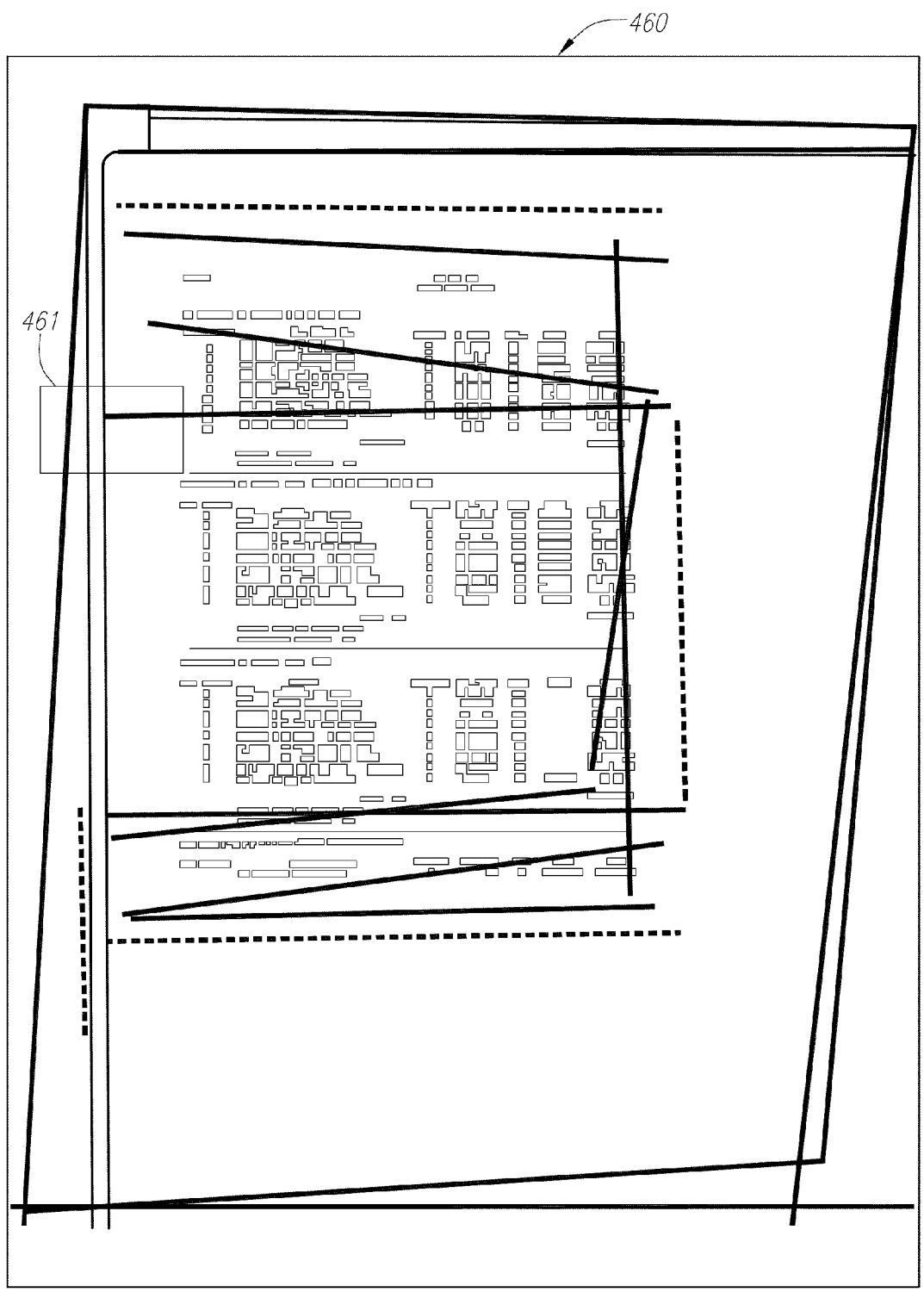
FIG. 22A is a schematic illustration of the digital image of FIG. 3A showing the potential edge lines remaining after a unification operation that is preferably performed as part of the edge selection step of FIG. 2.
Figure 22B:
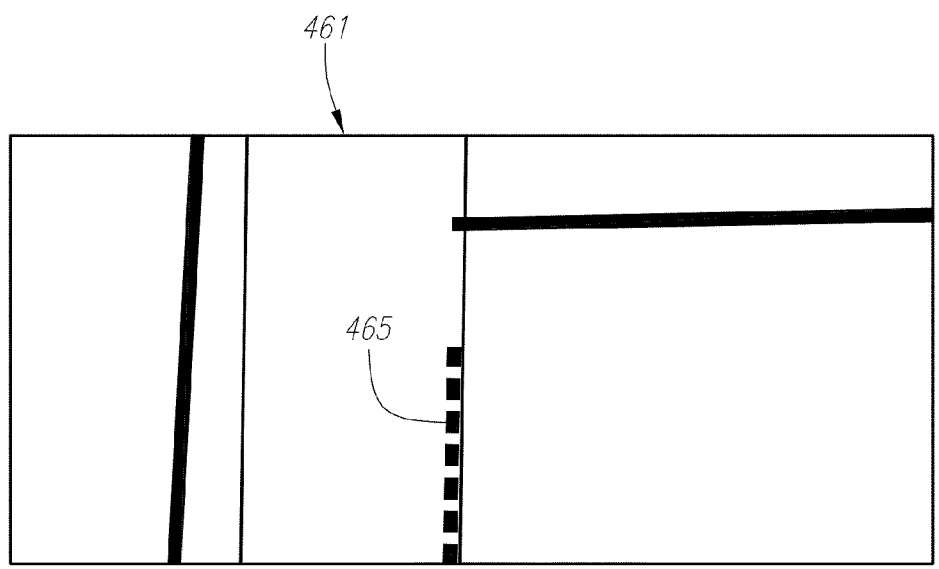
FIG. 22B shows an enlarged area in FIG. 22A.

In the present embodiment, edge unification operation 48 is achieved by finding two edge lines that have similar angle and position. These edge lines are merged into one larger edge line. To avoid creating a long edge line that is worse than the originals in terms of fitting, all three edge lines (two originals and the merged) are evaluated after the merge and the edge line with the best contrast will be kept. The other two will be eliminated from further consideration. FIG. 22A shows a schematic drawing of the exemplary raw image 460 with edge lines after unification. FIG. 22B shows an enlarged area 461 in FIG. 22A. Compare to FIG. 21B, after the edge unification operation 48, there are less edge line candidates to be considered as shown in FIG. 22B.

The fourth and also the last procedure in edge selection operation 42 of the embodiment of FIG. 16 is called heuristics operation 48. There are a number of heuristics measures by which collected edge lines can be sorted to represent the strength or likelihood of that edge line being the edge of a document within the image. Examples of edge line heuristics measures include the length of the edge line, contrast of the edge line, line angle relative to text body, line angle relative to the image, line distance from the text body, and line distance to the image boundary. The goal is to find a combination from the above-mentioned measures that could be used to select the best document edge lines.

In the present embodiment, a linear combination of length and contrast of an edge line is used to locate the five best potential edge lines for each cardinal side (left, right, top, and bottom) of an imaged document. Line contrast is the overall weight of an edge line and can be used to describe how good an edge line is. At an individual point, contrast is the individual differences in RGB intensities of points to either side of the point. The intensities are weighted according to a mask. In one embodiment, a mask of [2, 1, 0, −1, −2] is used to find the contrast of a point along a vertical line at coordinates (x,y). The contrast can be calculated as:

$$(2*r_{x-2}) + (1*r_{x-1}) + (0*r_x) + (-1*r_{x+1}) + (-2*r_{x+2}) +$$
$$(2*g_{x-2}) + (1*g_{x-1}) + (0*g_x) + (-1*g_{x+1}) + (-2*g_{x+2}) +$$
$$(2*b_{x-2}) + (1*b_{x-1}) + (0*b_x) + (-1*b_{x+1}) + (-2*b_{x+2})$$

The above magnitude is then normalized to be between 0 and 1. If the contrast of a point is closer to 0, there is a more uniform contrast. In other words, both sides of the point are similar in terms of RGB space. On the other hand, if a contrast of a point is 1, it means an ideal black-and-white contrast.

In the present embodiment, the contrast of an edge line is computed as the median value of all the point contrasts along the edge line. A higher contrasts of an edge line corresponds to an edge line that is more likely to be used in a document segmentation. The median contrast is used instead of the mean contrast is because that some document edges within the images may have shadows or bends that could reduce the average contrast of an edge line. Using the median eliminates the chance that a small section of uniform contrast affects overall edge strength.

The length of each edge line is normalized with respect to the larger image dimension to get a value also between 0 and 1. This value is added to the contrast value to produce the final edge line weight.

Figure 23A:
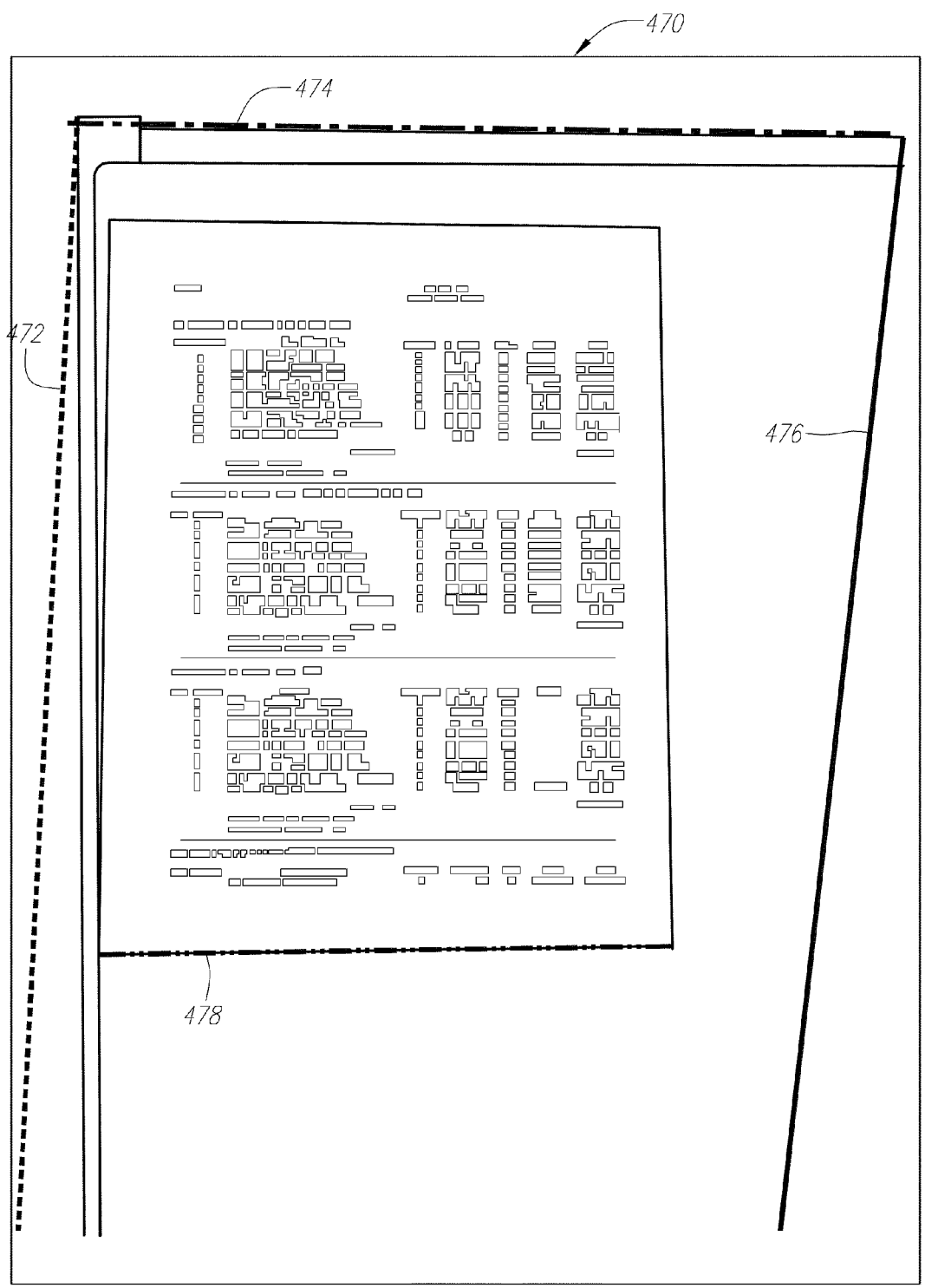
FIG. 23A is a schematic representation showing the best edge lines found for the digital image of FIG. 3A after completion of the edge selection step.
Figure 23B:
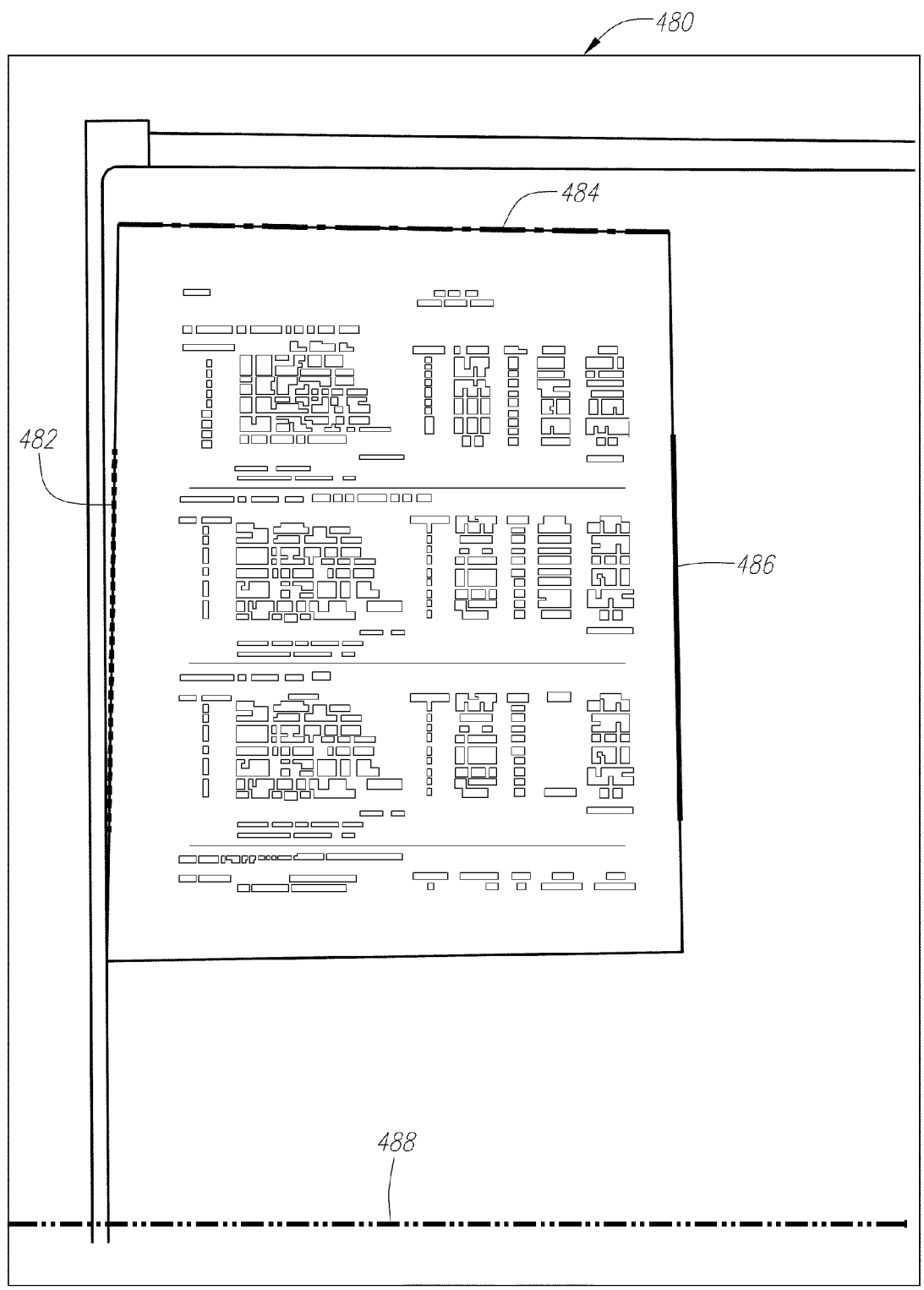
FIGS. 23B-23D schematically show the second, third and fourth best edge lines found, respectively.
Figure 23C:
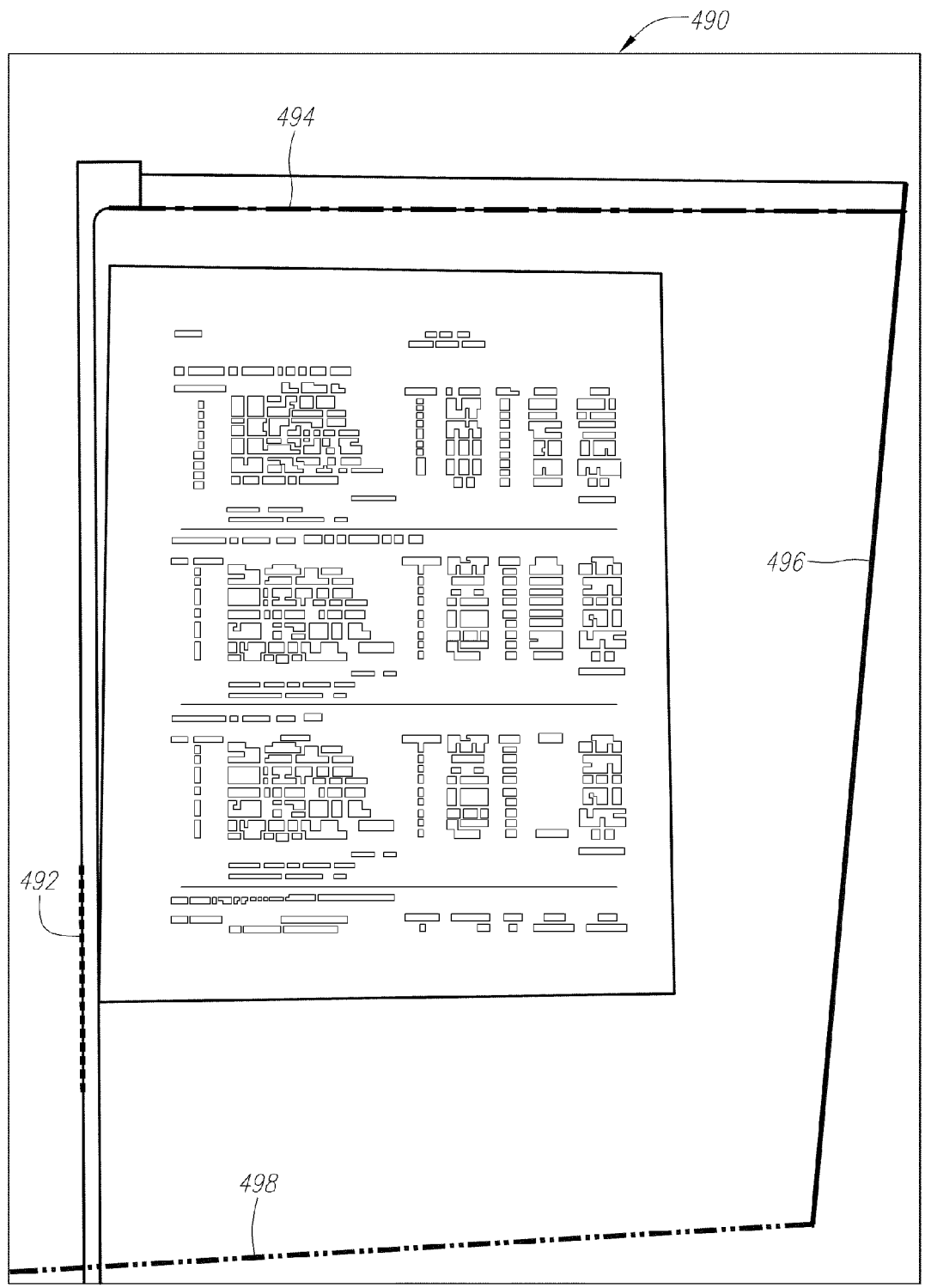
Figure 23D:
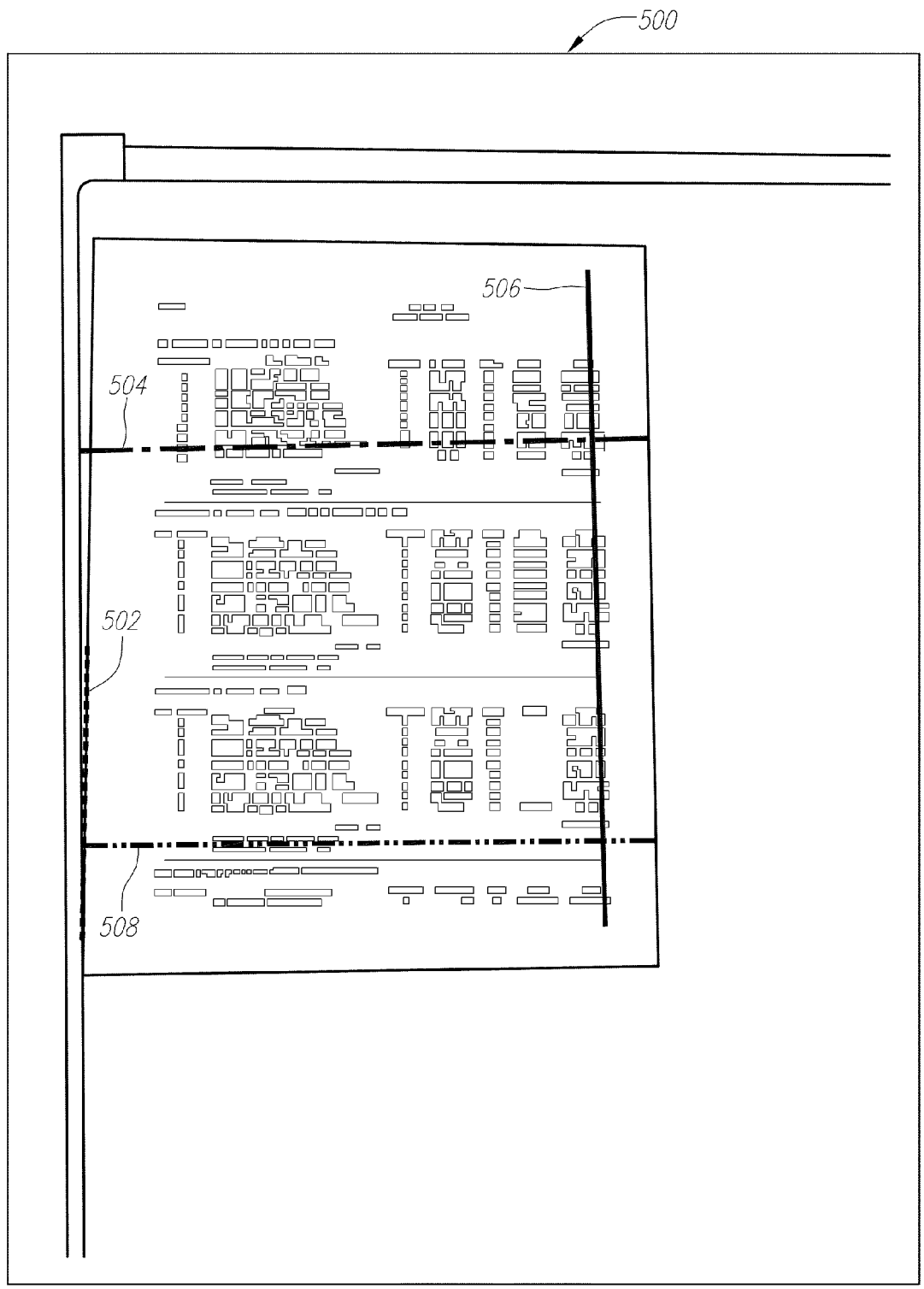

After the edge selection operation 42 is completed, edge lines can be ranked for each side of the image. FIGS. 23A-D show schematic drawings of the four best results found after the edge selection operation 42 is completed for the exemplary raw image of FIG. 3A. In FIG. 23A, the small dash line 472 represents the best left edge line, the double dash line 474 represents the best top edge line, the solid line 476 represents the best right edge line, and the large dash line 478 represents the best bottom edge line.

Referring back to FIG. 2, the five best edge lines from each cardinal side (left, right, top, and bottom) according to the operation of edge selection 42 are preferably selected. In the next processing step 50, a plurality of edge sets are preferably generated from the subsets of potential edges. An edge set is a set of four edge lines wherein each edge line represents one side of the imaged document 222. Thus, a plurality of edge sets may be generated in step 50 by combining one of the potential edge lines from each of the four subsets of edges to produce various unique edge sets. Preferably each possible edge set is generated from the four subsets of edge lines. Thus, if each subset of edge lines includes five edge lines, there will be $5^4$ (625) combinations of edge sets that represent 625 potential segmentations.

In addition, the output from text box operation 44 provides one extra quadrilateral edge set. The output from RANSAC operation 45 provides another extra quadrilateral edge set. Therefore, a total of 627 possible edge sets are available for further processing. Each of the 627 edge sets is evaluated by higher level constraints. The edge lines in each edge set usually may not form a quadrilateral. In one embodiment, for each of the 627 edge sets, a calculation is performed to find the intersections of the four edge lines for each of the 627 edge sets. Edge lines in each edge set would either be truncated or extended so that the four edge lines of each edge set form a quadrilateral. Thus, the original value of edge length is no longer used but replaced by the new length. Contrasts for each of the resulting edge lines in each of the edge sets are recalculated.

In one embodiment, a linear combination of heuristics includes the degree of symmetric trapezoidality, the area of the quadrilateral, and consistency of contrast are used to evaluate edge lines in the step 50. A deviation from the ideal value of each constraints is considered as an error value. In addition, the contrasts for all four edge lines in an edge set is used to reduce this error value. The edge set with the lowest total error is considered as the best fit for segmentation.

In the present embodiment, symmetric trapezoidality ($\tau$) is used to measured the deviation of the inner angles of a quadrilateral formed by an edge set from a rhombus or a trapezoid. The inner angles of the quadrilateral are sorted from the smallest to the largest ($a_4, a_3, a_2, a_1$). The symmetric trapezoidality can be calculated as:

$$\tau = |a_1 - a_2 + a_3 - a_4|$$

It can be seen that, in the present embodiment, the error value of the symmetric trapezoidality is zero if the quadrilateral formed by an edge set is a rhombus or a trapezoid.

When the area enclosed by an edge set is less than a predetermined value or ratio, in the present embodiment, a penalty is applied by adding an error value to the total error. In one embodiment, if the area enclosed by an edge set is less than 25% of the total image size, an area penalty (A) is added. Otherwise, A is set to be a 0. In one embodiment, the area penalty A is equal to 0.25.

Let $C_l$ represents the contrast of the left edge in an edge set, $C_r$ represents the contrast of the right edge in the same edge set, $C_t$ represents the contrast of the top edge, and $C_b$ represents the contrast of the bottom edge. Then, the contrast (C) for the edge set can be calculated as:

$$C = (C_l + C_r + C_t + C_b) \text{ and } \overline{C} = C/4.$$

In the present embodiment, the consistency of contrast among all four edge lines in an edge set can be calculated by the standard deviation ($\sigma$) of the contract of all four edge lines of the edge set. This consistency of contrast can be used as an indication of whether there is a set of consistent edge lines or a poorly chosen mix and match set of edge lines. The consistency of contrast can be calculated as.

$$\sigma = \frac{1}{2}\sqrt{(C_l - \overline{C})^2 + (C_r - \overline{C})^2 + (C_t - \overline{C})^2 + (C_b - \overline{C})^2}$$

In the present embodiment, a linear combination of heuristics described above is used to calculate the total deviation. In one embodiment, the combination of heuristics is shown in the following equation:

$$E = \frac{5}{2}\tau + 2\sigma + A - C$$

where E is the error value of an edge set, $\tau$ is the trapezoidality of the edge set, $\sigma$ is the contrast consistency of the edge set, A is the area penalty for the edge set (if any), and C is the median edge contrast for the edge set. By using the above equation, all 627 edge sets can be ranked in terms of the error value E.

The heuristic values calculated for the nine best edge sets determined for the exemplary image included in FIG. 3A are shown in the following table. Their corresponding edge sets are shown in FIGS. 24A-I.

|   | Trapezoidality ($5/2 \tau$) | Median Contrast (C) | Contrast Consistency ($2\sigma$) | Area (A) | Error |
|---|---|---|---|---|---|
| #1 | 0.136791 | 0.985948 | 0.0810317 | 35.2819% | −0.768125 |
| #2 | 0.108826 | 0.94085 | 0.126515 | 35.4032% | −0.705508 |
| #3 | 0.108221 | 0.912745 | 0.167341 | 39.9447% | −0.637183 |
| #4 | 0.141515 | 0.93268 | 0.15776 | 39.7736% | −0.633405 |
| #5 | 0.032414 | 0.707516 | 0.14283 | 38.4553% | −0.532273 |
| #6 | 0.069529 | 0.729412 | 0.133977 | 38.3047% | −0.525906 |
| #7 | 0.133173 | 0.837582 | 0.229735 | 25.6308% | −0.474674 |
| #8 | 0.133802 | 0.803595 | 0.202533 | 37.2905% | −0.467259 |
| #9 | 0.111967 | 0.804575 | 0.225906 | 29.1506% | −0.466702 |

It is noted that the entries under the Trapezoidality column are equal to $5/2\tau$ and the entries under the Contrast Consistency column are equal to $2\sigma$. Because the area enclosed by the edge sets shown in the table are all greater than 25% of the total image size, the area penalty A was zero for all nine edge sets. Therefore, the right-most column (Error) can be calculated by adding the second column entry (Trapezoidality) and the fourth column entry (Contrast Consistency) and then subtracting the third column entry (Contrast).

Figure 24:
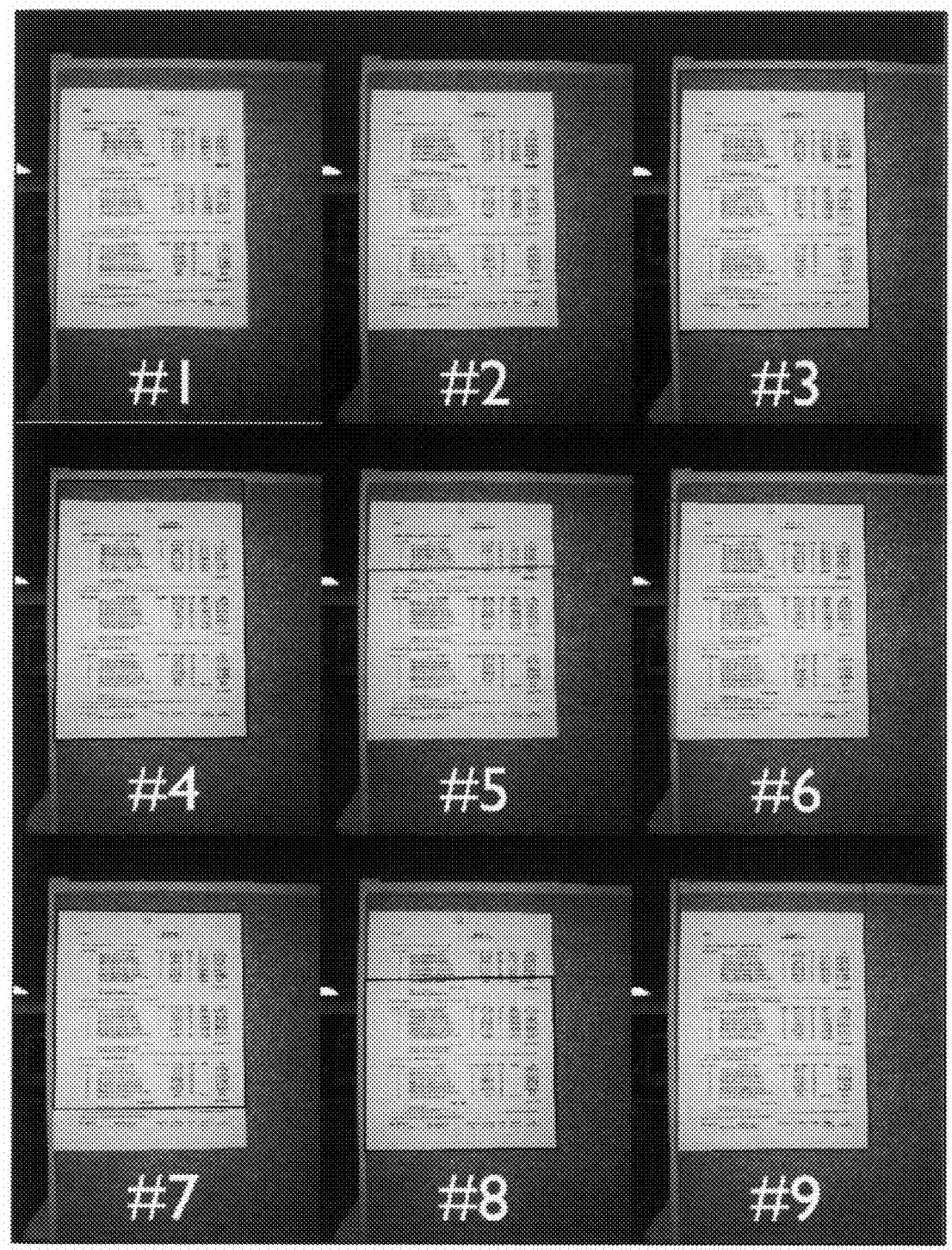
FIG. 24 illustrates the nine best edge sets found for the digital image of FIG. 3A employing the method of FIG. 2.
Figure 25A:
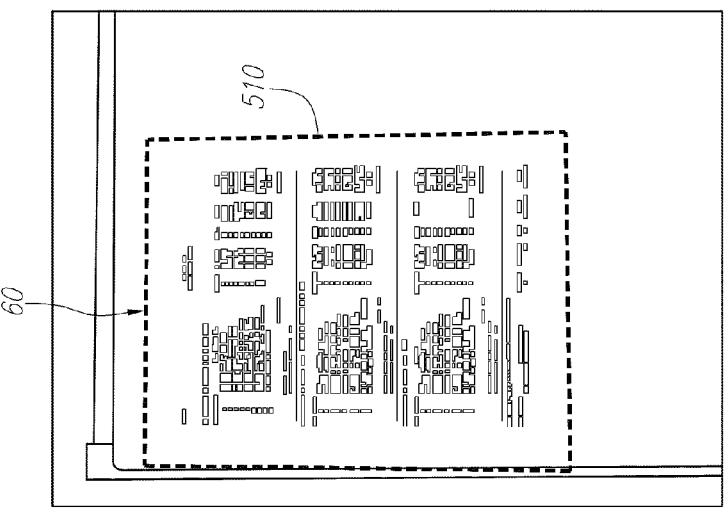
FIGS. 25A-I are schematic representations of the nine best edge sets shown in FIG. 24.
Figure 25B:
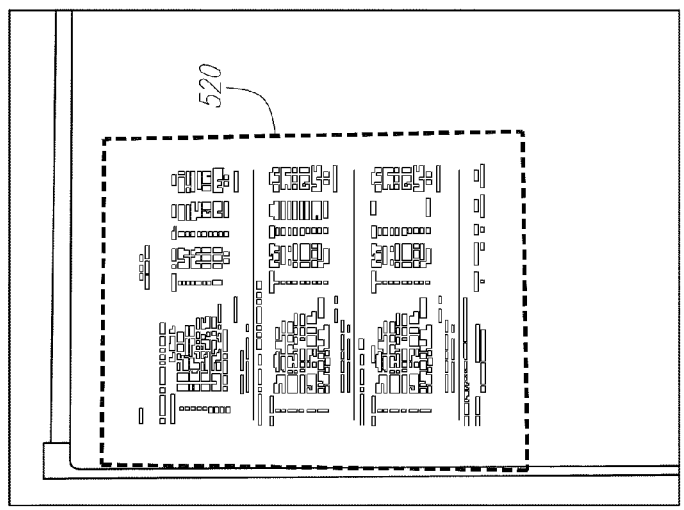
Figure 25C:
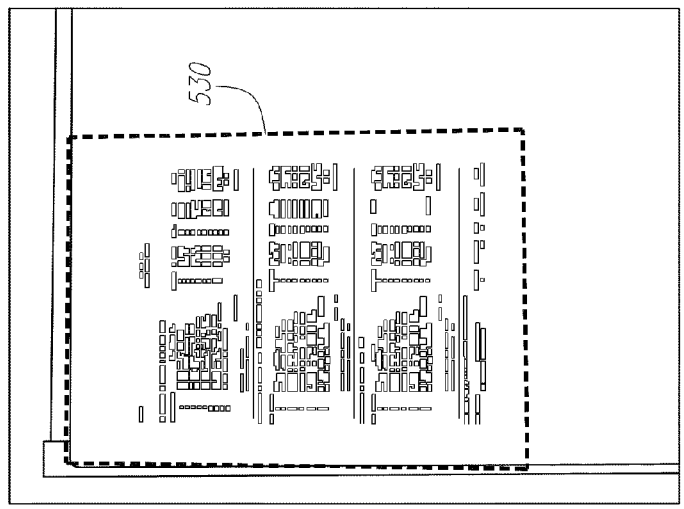
Figure 25F:
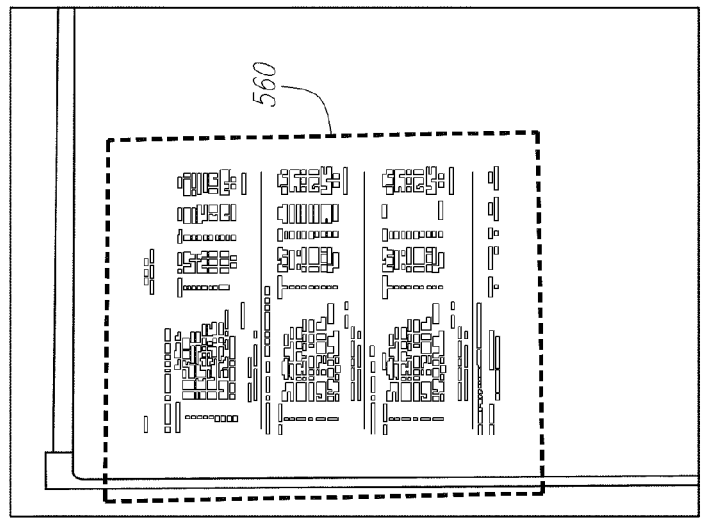
Figure 25E:
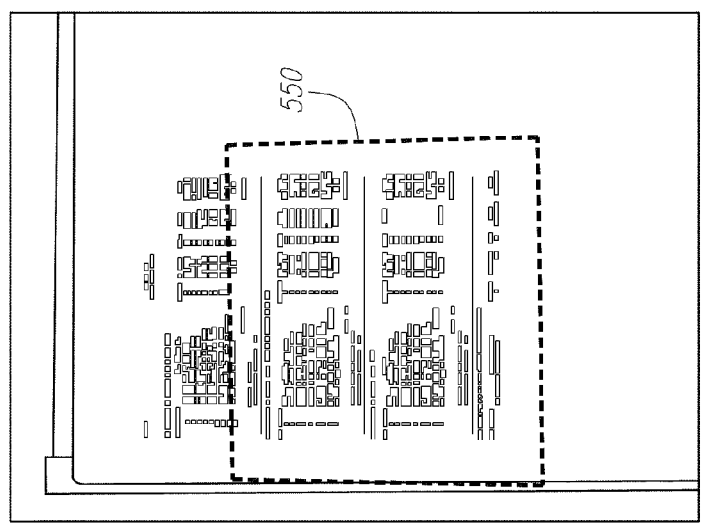
Figure 25D:
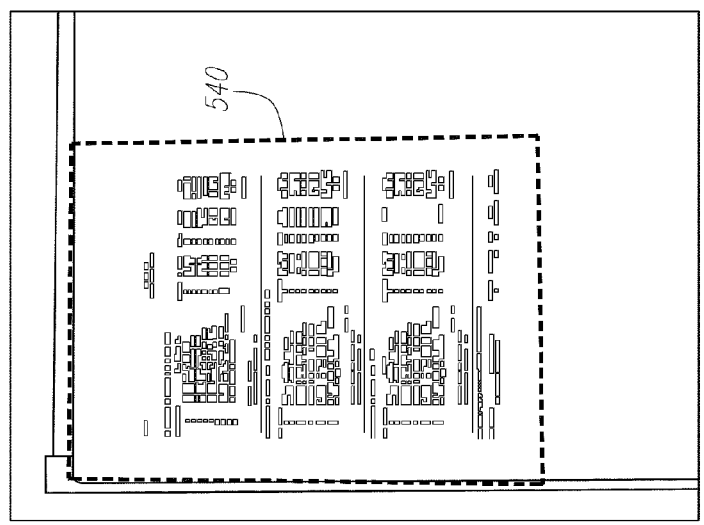
Figure 25I:
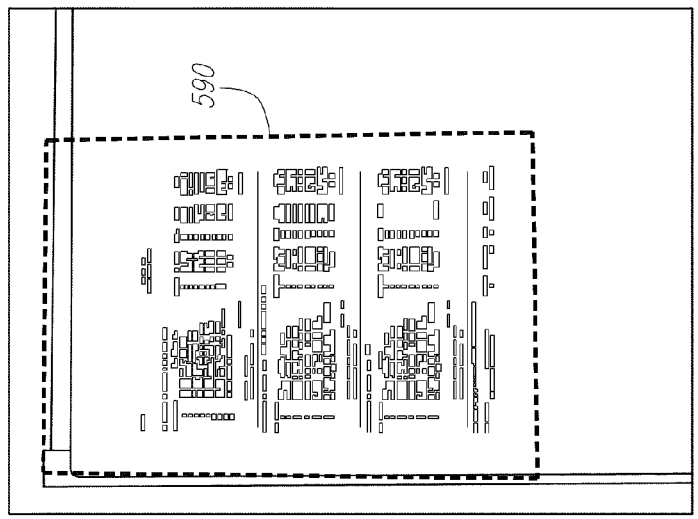
Figure 25H:
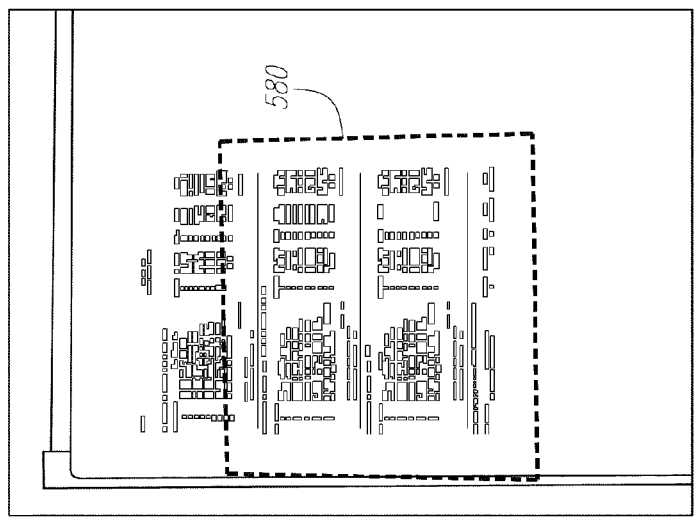
Figure 25G:
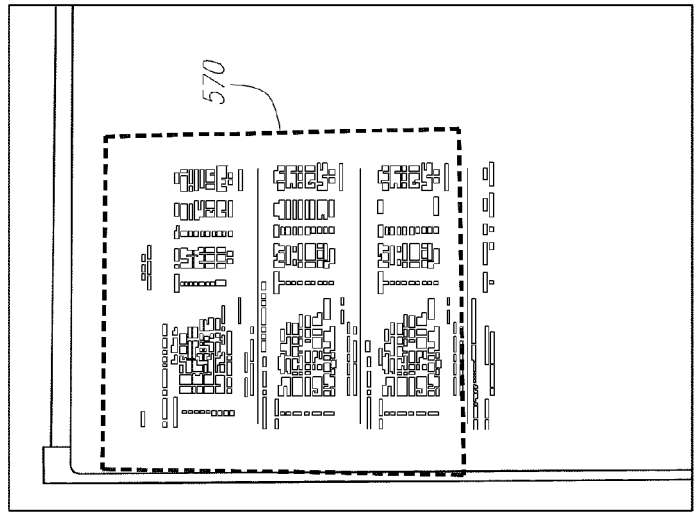

FIG. 24 shows the nine best edge lines found after the polygonal reasoning step for the exemplary raw image of FIG. 3A. FIGS. 25A-I shows schematic drawings of the nine best edge lines of FIG. 24. Notice that there is only a small difference between the top two edge sets shown in FIG. 25A and FIG. 25B. In FIG. 25A, the left edge is that of the paper—the correct segmentation. In FIG. 25B, the left edge is the inner transition of the metal bulletin board. This inner edge is just far enough away from the paper's edge to avoid unification. In the present embodiment, the best edge set 510 is used to segment the imaged document 60. Alternatively, in other embodiments, a small number of high-ranking edge sets can be displayed on a computer graphic interface for a user to select the best edge set based on his or her judgment. The digital image 220 will then be segmented in step 60 using the edge set selected by the user. For systems employing machine learning techniques, this process may be included as an option to permit additional training of the system and to allow the system to determine the appropriate weights to be applied to the selection criteria used in the determining step 50 so that more accurate segmentations may be made in the future when executing the imaged document segmentation method 10.

In the embodiment previously described, the extension (or truncation) or the texture to both sides of an edge line are not included in the combination of heuristics. Alternatively, one or both of the above two heuristics can be combined into the linear combination described earlier. In one embodiment, texture to both sides of an edge is used as a heuristic to decide how good an edge is. Unlike contrast, which only compares narrow bands of pixels, texture compares the entire area of pixels and can eliminate lines that go through uniform sections in an image, such as text area. Thus, texture provides more accurate representations of how good an edge is. Texture can be calculated by scanning a window of pixels along the edge's minor axis and adding the corresponding RGB pixel values to either an inside texture holder or an outside texture holder. The two holders are named to express if the texture is closer to the inside or the outside of the image. After all of the pixels have been added to their proper holders, each holder is averaged by the number of pixels within the holder to calculate the average RGB value for that side of the edge. The difference of the two holders, inside and outside are used to calculate a normalized value for the texture strength.

As described previously, in order to get a full document segmentation, the four intersection points of an original edge set are calculated and the quadrilateral's edges are used as the new edge that are often in different sizes than the original edge segments. In one embodiment, the degree an edge has to be truncated or extended is used as a penalty to be added to the total error of an edge set.

In one embodiment, a neural network is trained to rank edge sets values based on these heuristics. In another embodiment, a prioritization of certain parameters are considered. For example, contrast exclusively, except when the numbers are close enough is used to merit tie-breaking with other heuristics. In one embodiment, human intervention is allowed as a final approach. This is especially helpful when several segmentations are ranked closely.

The various methods described in the present application may be implemented on a computer system. According to one embodiment, the processing of the captured image is provided by a computer system in response to a processor executing one or more sequences of one or more instructions contained in a memory. Execution of the sequences of instructions contained in the memory causes the processor to perform the process steps 30, 40, 50 described herein.

The computer system may include a communication interface for providing a two-way data communication coupling to a network link that is connected to a local network. The network link typically provides data communication through one or more networks to other data services. The computer system can send messages and receive data, including program code, through the network(s), the network link and the communication interface.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. Indeed, it is contemplated that any combination of features disclosed herein may be combined with any other or combination of other features disclosed herein without limitation.

Furthermore, in describing preferred embodiments, specific terminology is resorted to for the sake of clarity. However, the invention is not intended to be limited to the specific terms so selected, and it is to be understood that each specific term includes all equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed:

1. A method for processing a digital image, said digital image comprising an imaged document and surrounding image, said method comprising:
   finding potential edges of said imaged document by at least two different computer implemented edge detection techniques;
   grouping the found potential edges into top, bottom, left and right side potential edge groups;
   for each edge group, selecting a subset of potential edges that are determined to likely represent an edge of the imaged document;
   determining the edges of the imaged document, wherein said determining step includes further analysis of the subsets of potential edges; and
   segmenting the imaged document from the digital image using the determined edges of the imaged document.

2. The method of claim 1, wherein the selecting step comprises culling a plurality of edges, snapping the culled edges, and unifying the snapped edges.

3. The method of claim 1, wherein the determining step comprises a process of generating a plurality of edge sets from the subsets of potential edges.

4. The method of claim 3, wherein the process of generating the plurality of edge sets further comprises determining each possible edge set from the subsets of the potential edges.

5. The method of claim 4, wherein the determining step further comprises forming a second plurality of edge sets by adding an additional edge set generated by an edge detection technique to the plurality of edge sets determined from the subsets of the potential edges.

6. The method of claim 5, wherein the determining step further comprises selecting from the second plurality of edge sets an edge set that most accurately represent the edges of the imaged document based on predefined comparison criteria.

7. The method of claim 6, wherein the predefined comparison criteria includes at least one attribute of the edge sets selected from the group consisting of trapezoidality, contrast, contrast consistency, area, texture, and edge length variation.

8. The method of claim 7, wherein the predefined comparison criteria is a linear combination of the trapezoidality of an edge set, the median contrast of edges of an edge set, the area formed by the edges of an edge set, and the contrast consistency of edges of an edge set.

9. The method of claim 3, wherein the determining step further comprises forming a second plurality of edge sets by adding an additional edge set generated by an edge detection technique to the plurality of edge sets determined from the subsets of the potential edges.

10. The method of claim 9, wherein the added edge set is generated by a lines of text technique.

11. The method of claim 9, wherein the added edge set is generated by a RANSAC technique.

12. The method of claim 3, wherein the determining step further comprises selecting from the plurality of edge sets an edge set that most accurately represent the edges of the imaged document based on predefined comparison criteria.

13. A computer system for processing a digital image comprising an imaged document and surrounding image, said computer system comprising:
one or more processors; and
a memory including one or more sequences of one or more instructions which, when executed by one or more processors, cause the one or more processors to perform the computer-implemented steps of:
finding potential edges of said imaged document by at least two different computer implemented edge detection techniques;
grouping the found potential edges into top, bottom, left and right side potential edge groups;
for each edge group, selecting a subset of potential edges that are determined to likely represent an edge of the imaged document;
determining the edges of the imaged document, wherein said determining step includes further analysis of the subsets of potential edges; and
segmenting the imaged document from the digital image using the determined edges of the imaged document.

14. A non-transitory computer readable medium for processing a captured image including a digital image comprising an imaged document and surrounding image, the non-transitory computer readable medium carrying one or more sequences of one or more instructions which, when executed by one or more processors, cause the one or more processors to perform the computer-implemented steps of:
finding potential edges of said imaged document by at least two different computer implemented edge detection techniques;
grouping the found potential edges into top, bottom, left and right side potential edge groups;
for each edge group, selecting a subset of potential edges that are determined to likely represent an edge of the imaged document;
determining the edges of the imaged document, wherein said determining step includes further analysis of the subsets of potential edges; and
segmenting the imaged document from the digital image using the determined edges of the imaged document.

15. A method for processing a digital image, said digital image comprising an imaged document and surrounding image, said method comprising:
generating a plurality of potential edge sets for the imaged document using one or more computer implemented edge detection techniques, wherein at least one of the edge sets in the plurality of potential edge sets includes edges formed from multiple edge detection techniques;
selecting from the plurality of edge sets an edge set that most accurately represent the edges of the imaged document based on predefined comparison criteria; and
segmenting the imaged document from the digital image using the selected edge set.

16. The method of claim 15, wherein the predefined comparison criteria includes at least one attribute of the edge sets selected from the group consisting of trapezoidality, contrast, contrast consistency, area, texture, and edge length variation.

17. The method of claim 15, wherein the plurality of potential edge sets also includes an edge set the edges of which are all determined by a single edge detection technique.

18. The method of claim 17, wherein the edge set the edges of which are all determined by a single edge detection technique is generated by a lines of text technique.

19. The method of claim 18, wherein the edge set the edges of which are all determined by a single edge detection technique is generated by RANSAC technique.

20. The method of claim 18, wherein the plurality of potential edge sets also includes a second edge set the edges of which are all determined by a RANSAC technique.

21. A method for processing a digital image, said digital image comprising an imaged document and surrounding image, said method comprising:
generating a plurality of potential edge sets for the imaged document using one or more computer implemented edge detection techniques;
selecting from the plurality of edge sets an edge set that most accurately represent the edges of the imaged document based on predefined comparison criteria; wherein the predefined comparison criteria includes at least one attribute of the edge sets selected from the group consisting of trapezoidality, contrast, contrast consistency, area, texture, and edge length variation, wherein the predefined comparison criteria is a linear combination of the trapezoidality of an edge set, the median contrast of edges of an edge set, the area formed by the edges of an edge set, and the contrast consistency of edges of an edge set; and
segmenting the imaged document from the digital image using the selected edge set.

22. A method for processing a digital image, said digital image comprising an imaged document and surrounding image, said method comprising:
finding potential edges of said imaged document by at least two different computer implemented edge detection techniques;
grouping the found potential edges into top, bottom, left and right side potential edge groups;
for each edge group, selecting a subset of potential edges that are determined to likely represent an edge of the imaged document;
generating a plurality of edge sets from the subsets of potential edges;
selecting from the plurality of edge sets a small subset of edge sets that are determined to most accurately represent the edges of the imaged document by using predefined comparison criteria;
displaying a small subset of the edge sets on a computer graphic user interface;
receiving an input from a user corresponding to the best displayed edge set; and
segmenting the imaged document from the digital image using the best displayed edge set.

23. A method for processing a digital image, said digital image comprising an imaged document and surrounding image, said method comprising:
generating a plurality of potential edge sets for the imaged document using one or more computer implemented edge detection techniques, wherein at least one of the edge sets in the plurality of potential edge sets includes edges formed from multiple edge detection techniques;
selecting from the plurality of edge sets a small subset of edge sets that are determined to most accurately represent the edges of the imaged document by using predefined comparison criteria;

displaying the small subset of edge sets on a computer graphic user interface;

receiving an input from a user corresponding to the best displayed edge set; and segmenting the imaged document from the digital image using the best displayed edge set.

* * * * *